US006223218B1

(12) United States Patent
Iijima et al.

(10) Patent No.: US 6,223,218 B1
(45) Date of Patent: Apr. 24, 2001

(54) SYSTEM AND METHOD FOR AUTOMATICALLY SETTING VLAN CONFIGURATION INFORMATION

(75) Inventors: Akio Iijima; Yukihiro Yamamoto, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/148,513

(22) Filed: Sep. 4, 1998

(30) Foreign Application Priority Data

Feb. 10, 1998 (JP) .................................................. 10-028837

(51) Int. Cl.[7] .......................... G06F 15/177; G06F 15/173
(52) U.S. Cl. .......................... 709/221; 709/220; 709/223; 370/254; 370/255; 370/397; 370/399
(58) Field of Search ..................................... 370/254, 255, 370/390, 397, 399; 709/225, 228, 218, 220, 221, 222, 224, 223, 229, 245, 250

(56) References Cited

U.S. PATENT DOCUMENTS

| 5,751,967 | * | 5/1998 | Raab et al. ............................. 709/228 |
| 5,892,912 | * | 4/1999 | Suzuki et al. ......................... 709/218 |
| 5,910,955 | * | 6/1999 | Nishimura et al. ................... 370/401 |
| 5,920,699 | * | 6/1999 | Bare ....................................... 709/225 |
| 5,959,989 | * | 9/1999 | Gleeson et al. ....................... 370/390 |
| 6,041,057 | * | 3/2000 | Stone .................................... 370/397 |
| 6,061,334 | * | 5/2000 | Berlovitch et al. ................... 370/255 |

* cited by examiner

*Primary Examiner*—Mark H. Rinehart
*Assistant Examiner*—Paul Kang
(74) *Attorney, Agent, or Firm*—Scully, Scott, Murphy & Presser

(57) ABSTRACT

An automatic VLAN configuration information setting system comprising an automatic VLAN configuration information setting device and one or more switching hubs, for setting VLAN configuration information of the switching hubs, is proposed. When a terminal is added to or removed from an Ethernet port of a switching hub by the user, a VLAN alteration request section of the switching hub detects the event, and a VLAN alteration request is transmitted to the automatic VLAN configuration information setting device. In a database of the automatic VLAN configuration information setting device, VLAN detailed information concerning all the VLANs managed by the automatic VLAN configuration information setting device is stored. A VLAN configuration instruction text editing section of the automatic VLAN configuration information setting device edits a VLAN configuration instruction text (an instruction scenario) by referring to the VLAN alteration request and the VLAN detailed information. The VLAN detailed information stored in the database is updated according to the VLAN configuration instruction text, and the VLAN configuration information of the switching hub is updated according to the VLAN configuration instruction text, thereby VLAN configuration information of the switching hubs is automatically set and updated without efforts by network administrators.

20 Claims, 7 Drawing Sheets

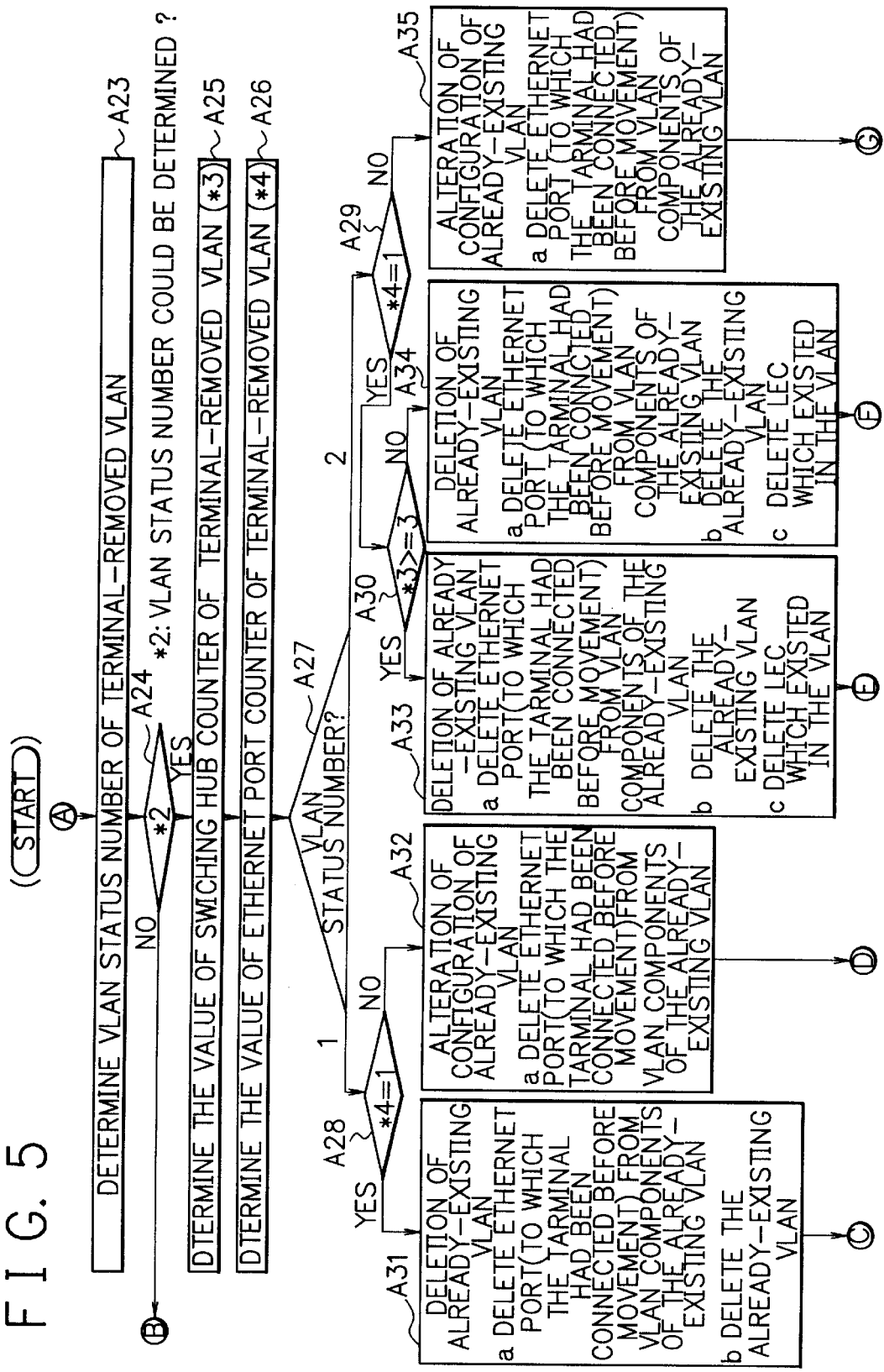
F I G. 5

SYSTEM AND METHOD FOR AUTOMATICALLY SETTING VLAN CONFIGURATION INFORMATION

BACKGROUND OF THE INVENTION

The present invention relates to a system and a method for automatically setting virtual LAN configuration information, and in particular, to a system and a method for automatically setting virtual LAN configuration information of a virtual LAN which is constructed by Ethernet port groups (each of which is composed of one or more Ethernet ports which have been selected from Ethernet ports in a switching hub) and LECs (LAN Emulation Clients) which are used in LANE (LAN Emulation).

Description of the Prior Art

Various kinds of communication methods or communication services have been proposed due to development and enlargement of information communication techniques of these days. Especially, LANs (Local Area Networks) which are constructed by connecting a plurality of computers together are widely utilized in various fields. Such LANs of these days employs a concept which is called "virtual LAN" (VLAN: Virtual Local Area Network). The VLAN has functions for arbitrarily and logically grouping terminals (or nodes) which are connected to switching hubs, thereby a LAN having desired connection can be virtually constructed regardless of real physical connection of the terminals. Therefore, the VLAN has advantages of being able to reduce unnecessary traffic and ensure security.

However, when a network administrator tries to employ the functions of the VLAN for a LAN, conventional switching hubs which can support the functions of the VLAN involves the following drawbacks.

The VLAN can be utilized for constructing virtual LAN segments at a low cost, by grouping terminals logically. The virtual LAN segment is composed of various elements such as Ethernet ports, IP subnets, ELANs (Emulated LANs), etc. which are linked together. Therefore, VLAN configuration information setting procedure which has to be executed by the network administrator tends to be highly complicated, and thus network administrators are required considerable amount of effort for constructing a VLAN.

SUMMARY OF THE INVENTION

It is therefore the primary object of the present invention to provide a system and a method for automatically setting VLAN configuration information, by which tasks of network administrators in VLAN configuration information setting procedure can be lightened, and labor and cost for operating and managing VLANs can be reduced.

In the following, an outline of the present invention will be described. An automatic VLAN configuration information setting system according to the present invention comprises an automatic VLAN configuration information setting device 1 and one or more switching hubs 2 as shown in FIG. 1. The switching hub 2 is provided with one or more (10 or 20, for example) Ethernet ports to each of which a terminal (such as a personal computer) can be connected. A switching hub 2 is related to (involved in) one or more VLANs, and VLAN configuration information of the VLANs related to the switching hub 2 are stored in a VLAN configuration information storage section 24 of the switching hub 2. In the automatic VLAN configuration information setting system according to the present invention, the VLAN configuration information stored in each switching hub 2 is set and updated automatically by the automatic VLAN configuration information setting device 1.

Referring to FIG. 1, when a terminal is connected to or removed from an Ethernet port of a switching hub communication function section 25 of a switching hub 2, the terminal movement detection section 213 in the switching hub 2 detects the event and activates the VLAN alteration request editing section 212. The VLAN alteration request editing section 212 edits a VLAN alteration request based on terminal connection information which has been obtained by the terminal movement detection section 213, and sends the VLAN alteration request to the VLAN alteration request transmission section 211. The VLAN alteration request edited by the VLAN alteration request editing section 212 includes, for example, information indicating the Ethernet port to which a terminal has been added or from which a terminal has been removed by the user (port No. etc.), information indicating the switching hub 2 itself (device ID etc.), and information indicating a VLAN (or one or more VLANs) to which the Ethernet port (the terminal) is related (VLAN name etc., which is managed by the automatic VLAN configuration information setting device 1 and also stored in the VLAN configuration information storage section 24). The VLAN alteration request transmission section 211 transmits the VLAN alteration request to the VLAN alteration request receiving section 18 of the automatic VLAN configuration information setting device 1, thereby process of the VLAN alteration request section 21 is finished.

In the automatic VLAN configuration information setting device 1, the VLAN alteration request received by the VLAN alteration request receiving section 18 is sent to the VLAN configuration instruction text editing section 15. The VLAN configuration instruction text editing section 15 is provided with a VLAN status variation device which is not shown in FIG. 1. The VLAN configuration instruction text editing section 15 edits input information which is used to operate the unshown VLAN status variation device, by referring to the VLAN alteration request and VLAN detailed information 19 which is stored in the database 11 of the automatic VLAN configuration information setting device 1. The VLAN detailed information 19 stored in the database 11 is detailed information of all the VLANs which have been constructed on switching hubs 2 which are managed by the automatic VLAN configuration information setting device 1.

FIG. 2 shows an example of the VLAN detailed information 19 concerning a VLAN (VLAN-A). Referring to FIG. 2, in the VLAN detailed information 19, element tables concerning intrinsic information of Ethernet port groups (192, 193), element tables concerning intrinsic information of LECs (194, 195), element tables concerning intrinsic information of switching hubs (196, 197), and element tables concerning intrinsic information of Ethernet ports (198, 199, 200) are defined, for example. Here, the LEC (Lan Emulation Client) is a functional component in LAN emulation (protocols for constructing virtual LAN -segments on an ATM network which have been standardized in "ATM Forum af_Iane_0021.00 January 1995") and becomes necessary when two switching hubs are connected in a VLAN. The "intrinsic information" means information concerning the component itself. For example, intrinsic information of a switching hub-A1 includes the device ID of the switching hub-A1, the IP address of the switching hub-A1, etc. Incidentally, a "VLAN status number" which will be described later is included in the VLAN detailed information 19, as intrinsic information of the VLAN-A. VLAN configuration of the VLAN-A composed of such components is defined by the VLAN detailed information 19 in the form of the element tables and links 201 between the element tables. Incidentally, the VLAN detailed information 19 shown in FIG. 2 is VLAN detailed information concerning a VLAN (named VLAN-A) only. When two or more VLANs (VLAN-B, VLAN-C, etc.) are registered in the VLAN detailed information 19 in the database 11 of the automatic VLAN configuration information setting device 1, similar VLAN detailed information concerning the VLAN-B, VLAN-C, etc. are generated in the VLAN detailed information 19.

FIG. 3 shows examples of input information which is edited by the VLAN configuration instruction text editing section 15 and variations in VLAN configuration status of a VLAN according to the input information. Referring to FIG. 3, the input information, which is edited by the VLAN configuration instruction text editing section 15 and supplied to the unshown VLAN status variation device, includes two types: input information 34, 35, 36 and 37 concerning a result for a question "The VLAN designated by the VLAN alteration request has been constructed on the switching hub designated by the VLAN alteration request?", and input information 39, 40, 41, 42 and 43 concerning "the number of Ethernet ports which are provided in the switching hub designated by the VLAN alteration request and which have been registered in the VLAN designated by the VLAN alteration request". The VLAN configuration instruction text editing section 15 edits the input information by referring to the VLAN alteration request and searching the VLAN detailed information which is stored in the database 11. Here, "the VLAN designated by the VLAN alteration request" means a VLAN to which the Ethernet port (to which a terminal has been added by the user) has been assigned by the user (in the case of an event of terminal addition), or a VLAN to which the Ethernet port (from which a terminal has been removed by the user) has been assigned by the user (in the case of an event of terminal removal).

Each of the input information 34, 35, 36 and 37 is utilized by the VLAN status variation device when it edits a VLAN configuration instruction text concerning a VLAN in which the Ethernet port (to which a terminal has been added by the user) will be additionally registered (hereafter referred to as an "addition VLAN configuration instruction text"), on a terminal addition event. On the other hand, each of the input information 39, 40, 41, 42 and 43 is utilized by the VLAN status variation device when it edits a VLAN configuration instruction text concerning a VLAN in which the Ethernet port (from which a terminal has been remove by the user) has been registered (hereafter referred to as a "deletion VLAN configuration instruction text", on a terminal removal (deletion) event.

Statuses of VLANs are managed and updated by the VLAN status variation device by means of the VLAN configuration instruction text. The VLAN status variation device handles three VLAN status numbers 0, 1 and 2 for expressing and recognizing the status of a VLAN which is managed by the VLAN status variation device. The VLAN statuses indicated by the VLAN status numbers 0, 1 and 2 are defined as follows.

A VLAN status 31 shown in FIG. 3 indicated by the VLAN status number "0" means a status in which a VLAN managed by the VLAN status variation device does not have any VLAN components. Here, the "VLAN managed by the VLAN status variation device" means a VLAN which has been constructed on the automatic VLAN configuration information setting device 1.

A VLAN status 32 shown in FIG. 3 indicated by the VLAN status number "1" means a status in which a VLAN managed by the VLAN status variation device has an Ethernet port group as a VLAN component and the VLAN has not been constructed across two or more switching hubs 2 (i.e. the VLAN has not been constructed on only one switching hub 2). Therefore, the VLAN status 32 with the VLAN status number "1" is a status in which an Ethernet port group has actually been registered in the VLAN which has been constructed on the automatic VLAN configuration information setting device 1.

A VLAN status 33 shown in FIG. 3 indicated by the VLAN status number "2" means a status in which a VLAN managed by the VLAN status variation device has Ethernet port groups and LECs as VLAN components and the VLAN has been constructed across two or more switching hubs 2. Therefore, the VLAN status 33 with the VLAN status number "2" is a status in which Ethernet port groups and LECs have actually been registered in the VLAN which has been constructed on the automatic VLAN configuration information setting device 1. Thus, two or more switching hubs 2 are physically related to (involved in) the VLAN which has the VLAN status number "2".

Examples of variations in the VLAN statuses of a VLAN will be explained referring to FIG. 3. For example, if the input information 34 shown in FIG. 3 is inputted to the VLAN status variation device in the status 31 having the VLAN status number "0", the VLAN status variation device edits a VLAN configuration instruction text for newly generating a VLAN which is composed of an Ethernet port group, and thereby changes the VLAN configuration status into the status 32 having the VLAN status number "1". On the other hand, if the input information 39 shown in FIG. 3 is inputted to the VLAN status variation device with respect to a VLAN in the status 32 with the VLAN status number "1", the VLAN status variation device edits a VLAN configuration instruction text for deleting an Ethernet port group composing the VLAN and thereby generating a status with no VLAN components, and thereby changes the VLAN configuration status of the VLAN into the status 31 having the VLAN status number "0".

As above, the VLAN configuration instruction text editing section 15 in the automatic VLAN configuration information setting device 1 edits the addition VLAN configuration instruction text or the deletion VLAN configuration instruction text by editing the input information and inputting the input information to its VLAN status variation device. Subsequently, the VLAN configuration instruction text editing section 15 sends the VLAN configuration instruction text to the VLAN remote update request editing section 14 and the database update section 16, and finishes its process caused by the VLAN alteration request.

The VLAN remote update request editing section 14 refers to the VLAN configuration instruction text, and thereby edits a VLAN remote update request which includes information for updating the VLAN configuration information which is stored in the VLAN configuration information storage section 24 of a corresponding switching hub 2. The VLAN remote update request editing section 14 sends the VLAN remote update request to the VLAN remote update request transmission section 17, and finishes its process. The VLAN remote update request transmission section 17 which received the VLAN remote update request transmits the VLAN remote update request to the VLAN remote update section 23 of the corresponding switching hub 2, and finishes its process.

The database update section 16 which received the VLAN configuration instruction text from the VLAN configuration instruction text editing section 15 updates the VLAN detailed information 19 stored in the database 11 into the latest information according to the VLAN configuration instruction text, using the database search section 12 and the database writing section 13.

The VLAN remote update section 23 in the switching hub 2 receives the VLAN remote update request from the automatic VLAN configuration information setting device 1 and updates the VLAN configuration information which is stored in the VLAN configuration information storage section 24, thereby automatic setting (updating) of VLAN configuration information of the switching hub 2 is finished.

As described above, the automatic VLAN configuration information setting system according to the present invention realizes automatic setting of VLAN configuration information of switching hubs 2 which are managed by the automatic VLAN configuration information setting device 1, thereby tasks of network administrators in VLAN configuration information setting procedure can be lightened, and labor and cost for operating and managing VLANs can be reduced.

In accordance with a first aspect of the present invention, there is provided an automatic VLAN configuration information setting system comprising an automatic VLAN configuration information setting means and one or more switching hubs. The switching hub includes a switching hub communication function means, a VLAN alteration request means, a VLAN configuration information storage means, a VLAN remote update means, and a VLAN control means. The switching hub communication function means is provided with one or more Ethernet ports to which terminals can be connected. The VLAN alteration request means generates a VLAN alteration request according to terminal connection information which is supplied from the switching hub communication function means, and sends the VLAN alteration request to the automatic VLAN configuration information setting means. The VLAN configuration information storage means stores VLAN configuration information concerning VLANs in which the switching hub is involved. The VLAN remote update means receives a VLAN remote update request which is sent from the automatic VLAN configuration information setting means, and updates the VLAN configuration information stored in the VLAN configuration information storage means according to the VLAN remote update request. The VLAN control means controls the switching hub communication function means according to the VLAN configuration information which is stored in the VLAN configuration information storage means. The automatic VLAN configuration information setting means includes a VLAN alteration request receiving means, a database, a database search means, a database writing means, a VLAN configuration instruction text editing means, a database update means, a VLAN remote update request editing means, and a VLAN remote update request transmission means. The VLAN alteration request receiving means receives the VLAN alteration request which is sent from the VLAN alteration request means of a switching hub. The database stores VLAN detailed information of VLANs in which the one or more switching hubs are involved. The database search means searches the database. The database writing means executes writing into the database. The VLAN configuration instruction text editing means edits a VLAN configuration instruction text according to the VLAN alteration request which is supplied from the VLAN alteration request receiving means and results of search for the VLAN detailed information which have been stored in the database using the database search means. The database update means updates the database by controlling the database writing means according to the VLAN configuration instruction text which is outputted by the VLAN configuration instruction text editing means. The VLAN remote update request editing means edits a VLAN remote update request which includes information about update of the VLAN configuration information which is stored in the VLAN configuration information storage means of a corresponding switching hub, by referring to the VLAN configuration instruction text which is outputted by the VLAN configuration instruction text editing means. The VLAN remote update request transmission means transmits the VLAN remote update request supplied from the VLAN remote update request editing means into the VLAN remote update means of the corresponding switching hub.

In accordance with a second aspect of the present invention, in the first aspect, the VLAN alteration request means in the switching hub includes a terminal movement detection means, a VLAN alteration request editing means, and a VLAN alteration request transmission means. The terminal movement detection means detects addition or removal of a terminal in the switching hub communication function means and outputs the terminal connection information concerning the addition/removal of the terminal. The VLAN alteration request editing means edits and outputs the VLAN alteration request according to the terminal connection information supplied from the terminal movement detection means. And the VLAN alteration request transmission means transmits the VLAN alteration request outputted by the VLAN alteration request editing means into the VLAN alteration request receiving means of the automatic VLAN configuration information setting means.

In accordance with a third aspect of the present invention, in the first aspect, the VLAN alteration request generated by the VLAN alteration request means of the switching hub includes information indicating an Ethernet port to which a terminal has been added or from which a terminal has been removed by the user, information indicating the switching hub, and information indicating a VLAN to which the Ethernet port is related.

In accordance with a fourth aspect of the present invention, in the third aspect, the VLAN configuration instruction text editing means includes a VLAN status variation means which receives input information which has been edited by the VLAN configuration instruction text editing means based on the VLAN detailed information stored in the database and the VLAN alteration request, edits the VLAN configuration instruction text according to the input information, and manages and varies the statuses of VLANs by outputting the VLAN configuration instruction text.

In accordance with a fifth aspect of the present invention, in the fourth aspect, the input information includes addition information which indicates that a terminal has been added to the switching hub.

In accordance with a sixth aspect of the present invention, in the fifth aspect, the addition information includes information indicating whether or not the VLAN designated by the VLAN alteration request has been constructed on the switching hub designated by the VLAN alteration request.

In accordance with a seventh aspect of the present invention, in the fourth aspect, the input information includes removal information which indicates that a terminal has been removed from the switching hub.

In accordance with an eighth aspect of the present invention, in the seventh aspect, the removal information includes information about the number of Ethernet ports which are provided in the switching hub designated by the VLAN alteration request and which have been registered in the VLAN designated by the VLAN alteration request.

In accordance with a ninth aspect of the present invention, in the fourth aspect, the status of the VLAN managed and varied by the VLAN status variation means is classified into: a status indicated by a VLAN status number 0 in which the VLAN managed by the VLAN status variation means has no VLAN components which have actually been registered in the VLAN detailed information, a status indicated by a VLAN status number 1 in which the VLAN managed by the VLAN status variation means has an Ethernet port group as a VLAN component which has actually been registered in the VLAN detailed information and the VLAN has not been constructed across two or more switching hubs, and a status indicated by a VLAN status number 2 in which the VLAN managed by the VLAN status variation means has Ethernet port groups and LECs (Lan Emulation Clients) as VLAN components which have actually been registered in the VLAN detailed information and the VLAN has been constructed across two or more switching hubs.

In accordance with a tenth aspect of the present invention, in the first aspect, the VLAN remote update request transmission means in the automatic VLAN configuration information setting means and the VLAN remote update means in the switching hub execute communication of the VLAN remote update request according to SNMP (Simple Network Management Protocol).

In accordance with an eleventh aspect of the present invention, there is provided a method for automatically setting VLAN configuration information of switching hubs in VLANs. A system which employs the method is composed of an automatic VLAN configuration information setting means and one or more switching hubs, The method comprises the steps of: a terminal connection information outputting step, a VLAN alteration request step, a VLAN alteration request receiving step, a VLAN configuration instruction text editing step, a database update step, a VLAN remote update request editing step, a VLAN remote update request transmission step, a VLAN remote update step, and a VLAN control step. In the terminal connection information outputting step, a switching hub communication function means of a switching hub provided with one or more Ethernet ports outputs terminal connection information of terminals which are connected to the Ethernet ports. In the VLAN alteration request step, a VLAN alteration request means of the switching hub generates a VLAN alteration request according to the terminal connection information supplied from the switching hub communication function means and sends the VLAN alteration request to the automatic VLAN configuration information setting means. In the VLAN alteration request receiving step, a VLAN alteration request receiving means of the automatic VLAN configuration information setting means receives the VLAN alteration request from the VLAN alteration request means of the switching hub. In the VLAN configuration instruction text editing step, a VLAN configuration instruction text editing means of the automatic VLAN configuration information setting means edits a VLAN configuration instruction text according to the VLAN alteration request and results of search of a database of the automatic VLAN configuration information setting means which stores VLAN detailed information of VLANs in which the one or more switching hubs are involved. In the database update step, a database update means of the automatic VLAN configuration information setting means updates the database according to the VLAN configuration instruction text which is outputted by the VLAN configuration instruction text editing means. In the VLAN remote update request editing step, a VLAN remote update request editing means of the automatic VLAN configuration information setting means edits a VLAN remote update request which includes information about update of VLAN configuration information which is stored in a VLAN configuration information storage means of a corresponding switching hub, by referring to the VLAN configuration instruction text which is outputted by the VLAN configuration instruction text editing means. In the VLAN remote update request transmission step, a VLAN remote update request transmission means of the automatic VLAN configuration information setting means transmits the VLAN remote update request supplied from the VLAN remote update request editing means into a VLAN remote update means of the corresponding switching hub. In the VLAN remote update step, the VLAN remote update means of the corresponding switching hub receives the VLAN remote update request from the VLAN remote update request transmission means of the automatic VLAN configuration information setting means, and updates the VLAN configuration information (concerning VLANs in which the switching hub is involved) which is stored in the VLAN configuration information storage means, according to the VLAN remote update request. And in the VLAN control step, a VLAN control means of the switching hub controls the switching hub communication function means of the switching hub according to the VLAN configuration information which is stored in the VLAN configuration information storage means.

In accordance with a twelfth aspect of the present invention, in the eleventh aspect, the VLAN alteration request step includes a terminal movement detection step, a VLAN alteration request editing step, and a VLAN alteration request transmission step. In the terminal movement detection step, a terminal movement detection means of the VLAN alteration request means detects addition or removal of a terminal in the switching hub communication function means and outputs the terminal connection information concerning the addition/removal of the terminal. In the VLAN alteration request editing step, a VLAN alteration request editing means of the VLAN alteration request means edits and outputs the VLAN alteration request according to the terminal connection information supplied from the terminal movement detection means. And in the VLAN alteration request transmission step, a VLAN alteration request transmission means of the VLAN alteration request means transmits the VLAN alteration request outputted by the VLAN alteration request editing means into the VLAN alteration request receiving means of the automatic VLAN configuration information setting means.

In accordance with a thirteenth aspect of the present invention, in the eleventh aspect, the VLAN alteration request which is generated in the VLAN alteration request step includes information indicating an Ethernet port to which a terminal has been added or from which a terminal has been removed by the user, information indicating the switching hub, and information indicating a VLAN to which the Ethernet port is related.

In accordance with a fourteenth aspect of the present invention, in the thirteenth aspect, the VLAN configuration instruction text editing step includes an input information editing step, an input information inputting step, and a VLAN configuration instruction text outputting step. In the input information editing step, the VLAN configuration instruction text editing means edits input information based on the VLAN detailed information stored in the database and the VLAN alteration request. In the input information inputting step, the VLAN configuration instruction text editing means inputs the input information into its VLAN status variation means. And in the VLAN configuration instruction text outputting step, the VLAN status variation means edits and outputs the VLAN configuration instruction text according to the input information in order to manage and vary the statuses of VLANs.

In accordance with a fifteenth aspect of the present invention, in the fourteenth aspect, the input information includes addition information which indicates that a terminal has been added to the switching hub.

In accordance with a sixteenth aspect of the present invention, in the fifteenth aspect, the addition information includes information indicating whether or not the VLAN designated by the VLAN alteration request has been constructed on the switching hub designated by the VLAN alteration request.

In accordance with a seventeenth aspect of the present invention, in the fourteenth aspect, the input information includes removal information which indicates that a terminal has been removed from the switching hub.

In accordance with an eighteenth aspect of the present invention, in the seventeenth aspect, the removal information includes information about the number of Ethernet ports which are provided in the switching hub designated by the VLAN alteration request and which have been registered in the VLAN designated by the VLAN alteration request.

In accordance with a nineteenth aspect of the present invention, in the fourteenth aspect, the status of the VLAN managed and varied by the VLAN status variation means is classified into: a status indicated by a VLAN status number 0 in which the VLAN managed by the VLAN status variation means has no VLAN components which have actually been registered in the VLAN detailed information, a status indicated by a VLAN status number 1 in which the VLAN managed by the VLAN status variation means has an Ethernet port group as a VLAN component which has actually been registered in the VLAN detailed information and the VLAN has not been constructed across two or more switching hubs, and a status indicated by a VLAN status number 2 in which the VLAN managed by the VLAN status variation means has Ethernet port groups and LECs (Lan Emulation Clients) as VLAN components which have actually been registered in the VLAN detailed information and the VLAN has been constructed across two or more switching hubs.

In accordance with a twentieth aspect of the present invention, in the eleventh aspect, the VLAN remote update request transmission means in the automatic VLAN configuration information setting means and the VLAN remote update means in the switching hub execute communication of the VLAN remote update request according to SNMP (Simple Network Management Protocol).

BRIEF DESCRIPTION OF THE DRAWINGS

The objects and features of the present invention will become more apparent from the consideration of the following detailed description taken in conjunction with the accompanying drawings, in which

FIGS. 5 and 6 are flow charts showing the operation of the VLAN configuration instruction text editing section for editing a VLAN configuration instruction text when a terminal has been removed from an Ethernet port of a switching hub;

DESCRIPTION OF THE PREFERRED EMBODIMENTS

Figure 1:
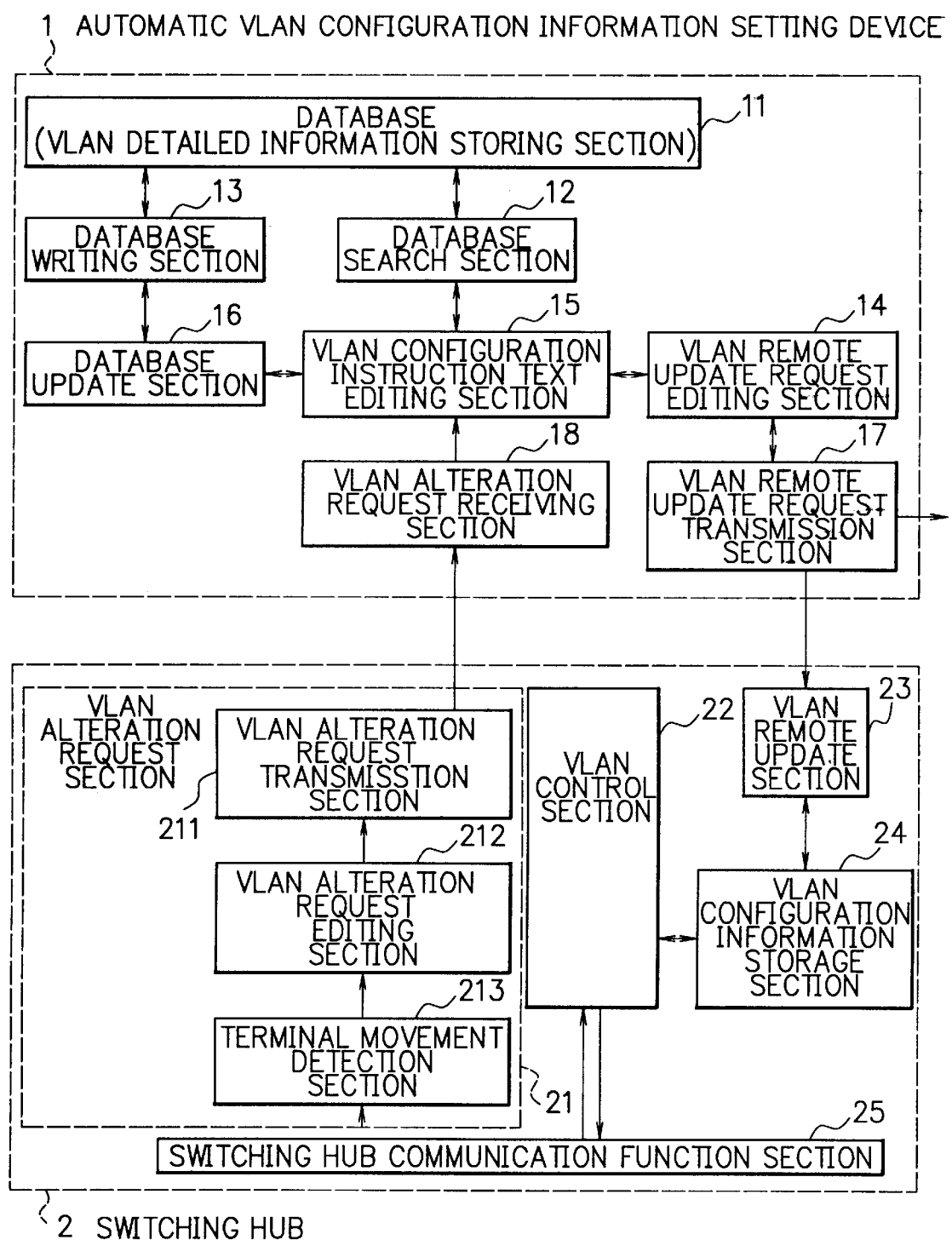
FIG. 1 is a diagram showing composition of an automatic VLAN configuration information setting device and a switching hub which are included in an automatic VLAN configuration information setting system according to a first embodiment of the present invention.

Referring now to the drawings, a description will be given in detail of preferred embodiments in accordance with the present invention.

FIG. 1 is a block diagram showing composition of an automatic VLAN configuration information setting device 1 and a switching hub 2 which are included in an automatic VLAN configuration information setting system according to a first embodiment of the present invention.

Referring to FIG. 1, the automatic VLAN configuration information setting system includes an automatic VLAN configuration information setting device 1 and a switching hub 2. Although only one switching hub 2 is shown in FIG. 1, the number of switching hubs 2 included in the automatic VLAN configuration information setting system can be an arbitrary number not less than 1. The automatic VLAN configuration information setting device 1 is provided to the automatic VLAN configuration information setting system, for example, as a server.

The switching hub 2 includes a VLAN alteration request section 21, a VLAN control section 22, a VLAN remote update section 23, a VLAN configuration information storage section 24, and a switching hub communication function section 25.

The switching hub communication function section 25 is provided with one or more Ethernet ports to each of which a terminal can be connected. The VLAN alteration request section 21 receives terminal connection information from the switching hub communication function section 25, edits a VLAN alteration request in consideration of the terminal connection information which has been supplied from the switching hub communication function section 25, and sends the VLAN alteration request to the automatic VLAN configuration information setting device 1. The VLAN remote update section 23 receives a VLAN remote update request from the automatic VLAN configuration information setting device 1, and updates VLAN configuration information stored in the VLAN configuration information storage section 24 according to the VLAN remote update request. The VLAN configuration information storage section 24 stores the VLAN configuration information concerning VLANs which are related to the switching hub 2. The VLAN control section 22 controls the switching hub communication function section 25 based on the VLAN configuration information which is stored in the VLAN configuration information storage section 24.

The VLAN alteration request section 21 in the switching hub 2 includes a VLAN alteration request transmission section 211, a VLAN alteration request editing section 212, and a terminal movement detection section 213. The terminal movement detection section 213 detects a change in the connection status of the Ethernet ports of the switching hub communication function section 25 (i.e. connecting/removing of terminals by the user). The VLAN alteration request editing section 212 edits a VLAN alteration request based on a detection signal which is supplied from the terminal movement detection section 213. The VLAN alteration request transmission section 211 transmits the VLAN alteration request which has been edited by the VLAN alteration request editing section 212 to the automatic VLAN configuration information setting device 1. The VLAN alteration request edited by the VLAN alteration request editing section 212 includes, for example, information indicating the Ethernet port to which a terminal has been added or from which a terminal has been removed by the user (port No. etc.), information indicating the switching hub 2 itself (device ID etc.) and information indicating a VLAN (or one or more VLANs) to which the Ethernet port (the terminal) is related (VLAN name etc., which is managed by the automatic VLAN configuration information setting device 1 and also stored in the VLAN configuration information storage section 24).

The above functional blocks in the switching hub 2 such as the VLAN alteration request transmission section 211, the VLAN alteration request editing section 212, the terminal movement detection section 213, the VLAN control section 22, and the VLAN remote update section 23 can be realized by, for example, a microprocessor unit composed of a CPU, ROM (Read Only Memory), RAM (Random Access Memory), etc. The VLAN configuration information storage section 24 is realized by, for example, one or more storage devices such as RAM etc. The VLAN alteration request transmission section 211 is provided with a communication interface for executing communication according to a protocol such as TCP/IP. The VLAN remote update section 23 is provided with a communication interface for executing communication according to a protocol such as SNMP (Simple Network Management Protocol). The switching hub communication function section 25 is provided with a communication interface supporting Ethernet.

The automatic VLAN configuration information setting device 1 includes a database (VLAN detailed information storage section) 11, a database search section 12, a database writing section 13, a database update section 16, a VLAN configuration instruction text editing section 15, a VLAN remote update request editing section 14, a VLAN remote update request transmission section 17, and a VLAN alteration request receiving section 18.

The VLAN alteration request receiving section 18 receives the VLAN alteration request from the VLAN alteration request transmission section 211 of one of the switching hubs 2 and sends the VLAN alteration request to the VLAN configuration instruction text editing section 15. The VLAN configuration instruction text editing section 15 edits a VLAN configuration instruction text (that is, a "scenario" in which a sequence of instructions for updating the database 11 and the VLAN configuration information stored in the VLAN configuration information storage section 24 of the switching hub 2 is written), using the VLAN alteration request supplied from the VLAN alteration request receiving section 18 and a result of search of the database 11 by the database search section 12. The database update section 16 executes update of the database 11 using the database search section 12 and the database writing section 13 according to the VLAN configuration instruction text which is supplied from the VLAN configuration instruction text editing section 15.

The database 11 is utilized as a VLAN detailed information storage section which stores detailed information concerning all the VLANs which are managed by the automatic VLAN configuration information setting device 1. The database search section 12 executes search of the database 11 according to control of the VLAN configuration instruction text editing section 15. The VLAN remote update request editing section 14 converts the VLAN configuration instruction text into the aforementioned VLAN remote update request which will be transmitted to a corresponding switching hub 2. The VLAN remote update request transmission section 17 receives the VLAN remote update request from the VLAN remote update request editing section 14 and sends the VLAN remote update request to the VLAN remote update section 23 of the corresponding switching hub 2.

Incidentally, the VLAN configuration instruction text editing section 15 is provided with a VLAN status variation device which is not shown in FIG. 1. The unshown VLAN status variation device edits the VLAN configuration instruction text according to input information which is edited by the VLAN configuration instruction text editing section 15, and thereby varies the status of VLANs.

The above functional blocks in the automatic VLAN configuration information setting device 1 other than the database 11 can be realized by, for example, a microprocessor unit which is composed of a CPU, ROM, RAM, etc. The database 11 is realized by, for example, one or more storage devices such as an HDD (Hard Disk Drive), an MO (Magneto-Optical disk), RAM etc. The VLAN alteration request receiving section 18 is provided with a communication interface for executing communication with the VLAN alteration request transmission section 211 according to a protocol such as TCP/IP. The VLAN remote update request transmission section 17 is provided with a communication interface for executing communication with the VLAN remote update section 23 according to a protocol such as SNMP. Incidentally, the functional blocks of the automatic VLAN configuration information setting device 1 can also be realized on a commercially available personal computer, etc. In such cases, a computer-readable program which can instruct the computer to execute the functions of the functional blocks in the automatic VLAN configuration information setting device 1 is stored in a record medium, and the computer is operated according to the program which is stored in the record medium.

In the following, the operation of components of the automatic VLAN configuration information setting system shown in FIG. 1 will be described in detail.

Figure 2:
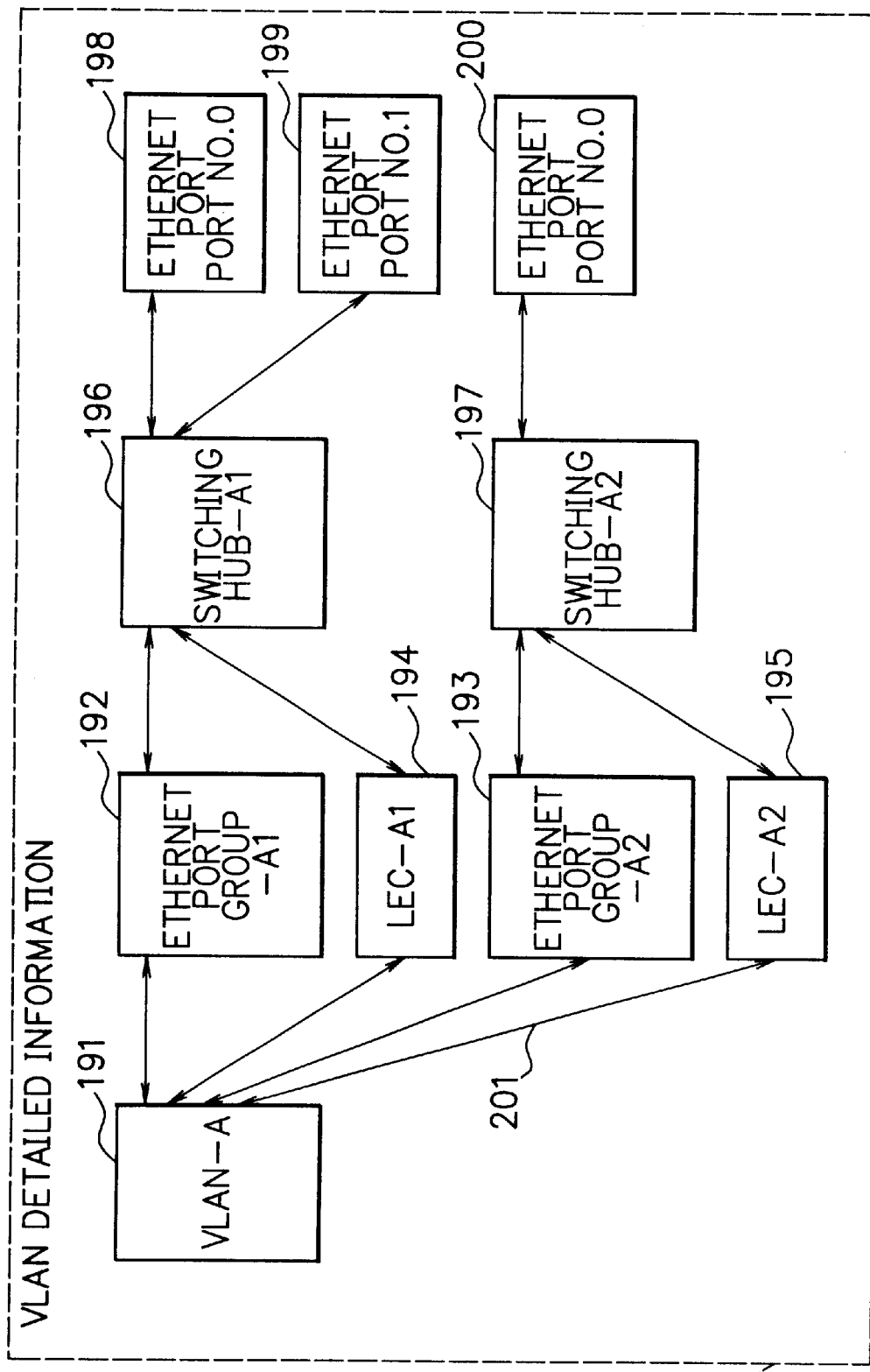
FIG. 2 is a schematic diagram showing an example of composition of VLAN detailed information which is stored in a database of the automatic VLAN configuration information setting device shown in FIG. 1.

FIG. 2 is a schematic diagram showing an example of composition of the VLAN detailed information 19 which is stored in the database 11 of the automatic VLAN configuration information setting device 1. Incidentally, the VLAN detailed information 19 shown in FIG. 2 is VLAN detailed information concerning a VLAN (named VLAN-A) only. In the case where two or more VLANs (VLAN-B, VLAN-C, etc.) are registered in the VLAN detailed information 19 in the database 11 of the automatic VLAN configuration information setting device 1, similar VLAN detailed information concerning the VLAN-B, VLAN-C, etc. are generated in the VLAN detailed information 19.

The VLAN detailed information 19 shown in FIG. 2 includes element tables concerning intrinsic information of Ethernet port groups (192, 193), intrinsic information of LECs (LAN Emulation Clients) (194, 195), intrinsic information of switching hubs (196, 197), and intrinsic information of Ethernet ports (198, 199, 200), for example. Here, the "intrinsic information" means information concerning the component itself, that is, information other than information concerning links between components). For example, intrinsic information of a switching hub-A1 includes the device ID of the switching hub-A1, the IP address of the switching hub-A1, etc. Incidentally, a "VLAN status number" (which will be described later) of each VLAN is included in the VLAN detailed information 19 as intrinsic information of the VLAN, as the VLAN-A table 191 shown on the left-hand side of the FIG. 2. The VLAN detailed information 19 shown in FIG. 2 is defined in the form of the element tables and links 201 between the element tables. Incidentally, the VLAN detailed information 19 shown in FIG. 2 is only and example, and thus the number of element tables in the VLAN detailed information can be arbitrarily changed.

The VLAN detailed information 19 which is defined by the element tables and the links 201 between the element tables is constructed in the database 11 from scratch, by update (i.e. registration/deletion of element tables, etc.) which is executed by the database update section 16. The database update section 16 executes the update of the database 11 using the database search section 12 and database writing section 13 based on information included in the VLAN configuration instruction text supplied from the VLAN configuration instruction text editing section 15, thereby the element tables concerning the intrinsic information of Ethernet port groups (192, 193), element tables concerning the intrinsic information of LECs (194, 195), element tables concerning the intrinsic information of switching hubs (196, 197), and element tables concerning the intrinsic information of Ethernet ports (198, 199, 200), and the links 201 between the element tables are generated as the VLAN detailed information 19 in the database 11.

Here, in the case where the VLAN status number of a VLAN (VLAN-A, for example) is "0", the VLAN detailed information 19 concerning the VLAN-A is composed of the VLAN-A table 191 only. Therefore, the VLAN status number "0" means that a LAN has been constructed but no component of the VLAN has been registered in the VLAN detailed information 19 in the database 11 of the automatic VLAN configuration information setting device 1. In this case with the status number "0", the user can not execute communication using the VLAN-A.

In the case where the VLAN status number is "1", the VLAN detailed information 19 of the VLAN-A is composed of the VLAN-A table 191, the Ethernet port group-A1 table 192, the switching hub-A1 table 196, and the Ethernet port tables 198 and 199, for example. In this case with the status number "1", the user can execute communication using the VLAN-A.

In the case where the VLAN status number is "2", the VLAN detailed information 19 of the VLAN-A is composed of the VLAN-A table 191, the Ethernet port group-A1 table 192, the LEC-A1 table 194, the switching hub-A1 table 196, the Ethernet port tables 198 and 199, the Ethernet port group-A2 table 193, the LEC-A2 table 195, the switching hub-A2 table 197, and the Ethernet port table 200, for example. In this case with the status number "2", at least two or more switching hubs are physically involved in the VLAN-A.

As mentioned before, the VLAN alteration request section 21 includes the terminal movement detection section 213, the VLAN alteration request editing section 212 and the VLAN alteration request transmission section 211.

When the connection status of the Ethernet ports of the switching hub communication function section 25 is changed (i.e. if a terminal is connected to one of the Ethernet ports or removed from one of the Ethernet ports), the change is detected by the terminal movement detection section 213, and the terminal movement detection section 213 activates the VLAN alteration request editing section 212.

The VLAN alteration request editing section 212 edits the VLAN alteration request based on terminal connection information obtained by the terminal movement detection section 213, and supplies the VLAN alteration request to the VLAN alteration request transmission section 211. Here, the VLAN alteration request at least includes information showing that a terminal has been removed from the Ethernet port or information showing that a terminal has been added to the Ethernet port.

The VLAN alteration request transmission section 211 transmits the VLAN alteration request to the VLAN alteration request receiving section 18 of the automatic VLAN configuration information setting device 1. By the transmission, the VLAN alteration request section 21 finishes its process.

Subsequently, the VLAN alteration request receiving section 18 in the automatic VLAN configuration information setting device 1 receives the VLAN alteration request from the switching hub 2, The VLAN configuration instruction text editing section 15 receives the VLAN alteration request from the VLAN alteration request receiving section 18, and edits input information which is used to operate its VLAN status variation device, by referring to the VLAN alteration request and the VLAN detailed information 19 which is shown in FIG. 2.

Figure 3:
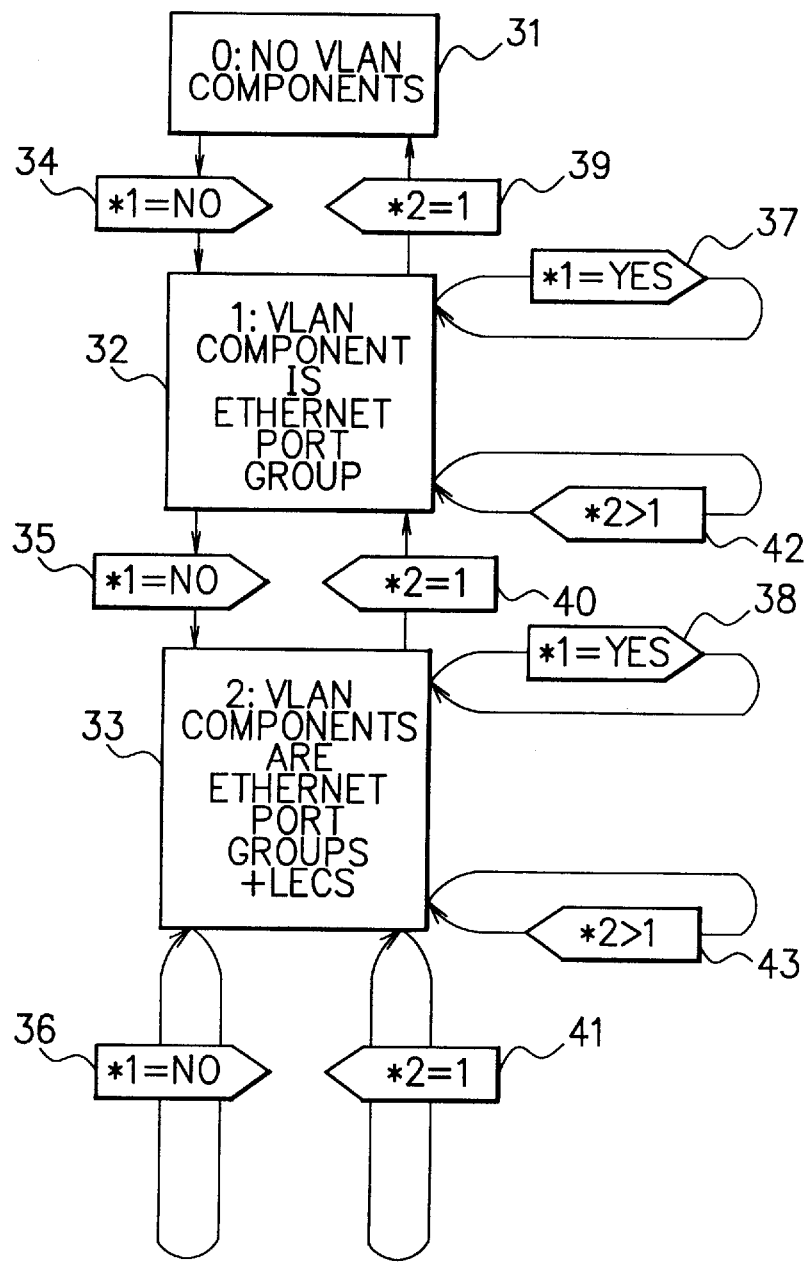
FIG. 3 is a schematic diagram showing examples of input information which is edited by the VLAN configuration instruction text editing section which is shown in FIG. 1 and variations in VLAN configuration status according to the input information.

FIG. 3 is a schematic diagram showing examples of the input information which is edited by the VLAN configuration instruction text editing section 15 and variations in VLAN configuration status of a VLAN according to the input information. The VLAN configuration instruction text editing section 15 executes search to the VLAN detailed information 19 in the database 11 using the database search section 12, and thereby executes the following two kinds of judgments. The first judgment is a judgment on "whether or not the VLAN designated by the VLAN alteration request has been constructed on the switching hub designated by the VLAN alteration request". Each of the input information 34, 35 and 36 shown in FIG. 3 is input information which is edited by the VLAN configuration instruction text editing section 15 and inputted to the unshown VLAN status variation device when the result of the first judgment is NO. Each of the input information 37 and 38 shown in FIG. 3 is input information which is edited and inputted to the VLAN status variation device in when the result of the first judgment is YES. The second judgment is a judgment on "the number of Ethernet ports which are provided in the switching hub designated by the VLAN alteration request and which have been registered in the VLAN designated by the VLAN alteration request". Each of the input information 39, 40 and 41 shown in FIG. 3 is input information which is edited and inputted to the VLAN status variation device when the result of the second judgment is "1". Each of the input information 37 and 38 shown in FIG. 3 is input information which is edited and inputted to the VLAN status variation device when the result of the second judgment is "more than 1".

In the following, variations in the VLAN configuration status of a VLAN will be explained referring to figures.

First, a case where a terminal is removed from an Ethernet port of the switching hub communication function section 25 will be described. Transitional variation of a VLAN to which the Ethernet port (from which the terminal has been removed by the user) has been registered (hereafter, referred to as a "terminal-removed VLAN") will be explained referring to FIGS. 1, 3, 5 and 6.

When a terminal is removed from an Ethernet port of the switching hub communication function section 25 of the switching hub 2 shown in FIG. 1, information indicating the terminal-removed VLAN is edited (included) in the VLAN alteration request which is edited by the VLAN alteration request editing section 212 of the switching hub 2.

The VLAN configuration instruction text editing section 15 in the automatic VLAN configuration information setting device 1 receives the VLAN alteration request. The VLAN configuration instruction text editing section 15 edits the VLAN configuration instruction text for varying the status of the terminal-removed VLAN, according to the VLAN alteration request and the VLAN detailed information which has been stored in the database 11.

Here, the status of a VLAN can generally be classified into three statuses: a status which is indicated by the VLAN status number "0", a status which is indicated by the VLAN status number "1", and a status which is indicated by the VLAN status number "2", as mentioned before and as shown in FIG. 3. These statuses of the VLAN are managed by the unshown VLAN status variation device of the VLAN configuration instruction text editing section 15, and are varied according to the input information which is edited by the VLAN configuration instruction text editing section 15, as will be described in detail.

The VLAN status indicated by the VLAN status number "0" is a status in which the unshown VLAN status variation device recognizes the VLAN but the VLAN has not actually been registered (i.e. VLAN components of the VLAN have not actually been registered in the VLAN detailed information 19 which is stored in the database 11 of the automatic VLAN configuration information setting device 1). Therefore, the user himself can remember and recognize physical connection of the VLAN having the VLAN status number "0" like "The VLAN-A is composed of this Ethernet port, that Ethernet port, . . . ." etc., but can not execute communication using the VLAN having the VLAN status number "0".

The VLAN status indicated by the VLAN status number "1" is a status in which the VLAN is composed of two or more Ethernet ports (an Ethernet port group) which have actually been registered in the VLAN detailed information 19 in the database 11 of the automatic VLAN configuration information setting device 1. In this status with the VLAN status number "1", it is not allowed to construct the VLAN including (across) two or more switching hubs. Therefore, the VLAN with the VLAN status number "1" is constructed within one switching hub 2.

Incidentally, the expression corresponding to *2 in FIG. 3: "the number of Ethernet ports which is provided in the switching hub designated by the VLAN alteration request and which exists in the VLAN designated by the VLAN alteration request" can also be expressed as "the number of Ethernet ports which have actually been registered in the same switching hub 2 and in the same VLAN". Therefore, hereafter, the above number will also be referred to as "the number of equivalent Ethernet ports".

As a matter of fact, in order to realize communication, an Ethernet port group (i.e. a VLAN) has to be composed of two or more Ethernet ports which have actually been registered in the VLAN detailed information 19 in the database 11. However, in the following explanation, a VLAN having only 1 registered Ethernet port will also be treated as a VLAN having the VLAN status number "1".

The VLAN status indicated by the VLAN status number "2" is a status in which the VLAN is composed of two or more Ethernet ports (Ethernet port groups) which have actually been registered in the VLAN detailed information 19 in the database 11, and especially, the VLAN is constructed across two or more switching hubs. Therefore, in the status with the VLAN status number "2", LECs (LAN Emulation Clients) for connecting the switching hubs become necessary as components of the VLAN.

Incidentally, a LEC is needed to be provided to each switching hub in order to connect the switching hub to other switching hubs in a VLAN. Therefore, the number of LECs in a VLAN is the same as the number of switching hubs in the VLAN, and thus the number of LECs is 2 or more when communication is actually executed on a VLAN having the VLAN status number "2". However, in the following explanation, a VLAN having only 1 LEC will also be treated as a VLAN having the VLAN status number "2".

In the following, variations in the status of the terminal-removed VLAN will be explained.

First, a case where the VLAN status number of the terminal-removed VLAN is 0 (VLAN status "31" shown in FIG. 3) will be considered. Here, the case where the VLAN status number of the terminal-removed VLAN is 0 means that the Ethernet port (from which a terminal has been removed by the user) has not been related to (involved in) a VLAN which is actually executing communication. In this case, the terminal has been removed by the user from the VLAN having the VLAN status number 0, therefore the VLAN status number of the VLAN does not change.

Next, a case where the VLAN status number of the terminal-removed VLAN is 1 (VLAN status "32" shown in FIG. 3, "1" in step A27 of FIG. 5) will be considered. Here, the case where the VLAN status number of the terminal-removed VLAN is 1 means that the Ethernet port (from which a terminal has been removed by the user) has been related to (involved in) a VLAN which has actually been utilized for communication (registered).

The case (where the VLAN status number of the terminal-removed VLAN is 1) can be classified into the following two cases. The first case is a case where the aforementioned "number of equivalent Ethernet ports" is 1 ("YES" in step A28 of FIG. 5). In the case, the VLAN status number of the terminal-removed VLAN is changed into 0 as shown in FIG. 3 by the input information 39 which is shown in FIG. 3 (step A44 in FIG. 6), since the VLAN status number "1" was indicating that no other switching hubs existed in the terminal-removed VLAN.

The second case is a case where the aforementioned "number of equivalent Ethernet ports" is 2 or more ("NO" in step A28 of FIG. 5). In the case, the VLAN status number of the terminal-removed VLAN is not changed from 1 by the input information 42 which is shown in FIG. 3 (step A45 in FIG. 6), since one or more other Ethernet ports (which are registered in the terminal-removed VLAN) exist in the switching hub from which the terminal has been removed by the user.

Next, a case where the VLAN status number of the terminal-removed VLAN is 2 (VLAN status "33" shown in FIG. 3, "2" in step A27 of FIG. 5) will be considered. Here, the case where the VLAN status number of the terminal-removed VLAN is 2 means that the Ethernet port (from which a terminal has been removed by the user) has been involved in a VLAN which has actually been utilized for communication (registered), and the VLAN has been constructed across two or more switching hubs. Therefore, LECs have to be provided to the terminal-removed VLAN as components, as mentioned before.

The case (where the VLAN status number of the terminal-removed VLAN is 2) can be classified into the following two cases. The first case is a case where the aforementioned "number of equivalent Ethernet ports" of the switching hub having the Ethernet port (from which the terminal has been removed by the user) is 2 or more ("NO" in step A29 of FIG. 5). Incidentally, in this case, the number of registered Ethernet ports in each of other switching hubs is not limited and can be either 1, or 2 or more. In the case (where the VLAN status number of the terminal-removed VLAN is 2 and the "number of equivalent Ethernet ports" is 2 or more), even if an Ethernet port (from which the terminal has been removed by the user) is deleted (in the sense of registration) from the switching hub, one or more Ethernet ports and one or more LECs remain at the switching hub. Therefore, the VLAN status number of the terminal-removed VLAN is not changed from 2 by the input information 43 which is shown in FIG. 3 (step A48 of FIG. 6), The second case is a case where the "number of equivalent Ethernet ports" is 1 ("YES" in step A29 of FIG. 5). Incidentally, also in this case, the number of registered Ethernet ports in each of other switching hubs is not limited and can be either 1, or 2 or more. The case (where the VLAN status number of the terminal-removed VLAN is 2 and the "number of equivalent Ethernet ports" is 1) can be further classified into two cases with respect to the number of switching hubs other than the switching hub having the Ethernet port from which the terminal has been removed by the user.

The first case is a case where the number of other switching hubs (than the switching hub having the Ethernet port from which the terminal has been removed by the user) is 2 or more, that is, a case where the number of LECs (i.e. the number of switching hubs) which have been registered in the terminal-removed VLAN is 3 or more ("YES" in step A30 of FIG. 5). In the case, an Ethernet port is deleted from the terminal-removed VLAN, and thereby a switching hub which is not involved in the terminal-removed VLAN may emerge and a LEC may be deleted. However, at least 2 or more LECs (i.e. 2 or more switching hubs) remain in the terminal-removed VLAN after the deletion of the Ethernet port, therefore, the input information 41 shown in FIG. 3 is inputted to the unshown VLAN status variation device and the VLAN status number of the terminal-removed VLAN is not changed from 2 (step A46 in FIG. 6).

The second case is a case where the number of other switching hubs (than the switching hub having the Ethernet port from which the terminal has been removed by the user) is 1 or less, that is, a case where the number of LECs which have been registered in the terminal-removed VLAN is 2 or less ("NO" in step A30 of FIG. 5). Incidentally, the least number of the LECs which have been registered in the terminal-removed VLAN is 2, since there is no case where only 1 LEC exists in the terminal-removed VLAN. In the case, an Ethernet port is deleted from the terminal-removed VLAN, and thereby a switching hub which is not involved in the terminal-removed VLAN emerges and a LEC is deleted. Therefore, no LECs remain in the terminal-removed VLAN after the deletion of the Ethernet port. Thus, the input information 40 shown in FIG. 3 is inputted to the unshown VLAN status variation device, and the VLAN status number of the terminal-removed VLAN is changed into 1 (step A47 in FIG. 6).

The VLAN configuration status of the terminal-removed VLAN is varied as described above.

Figure 4:
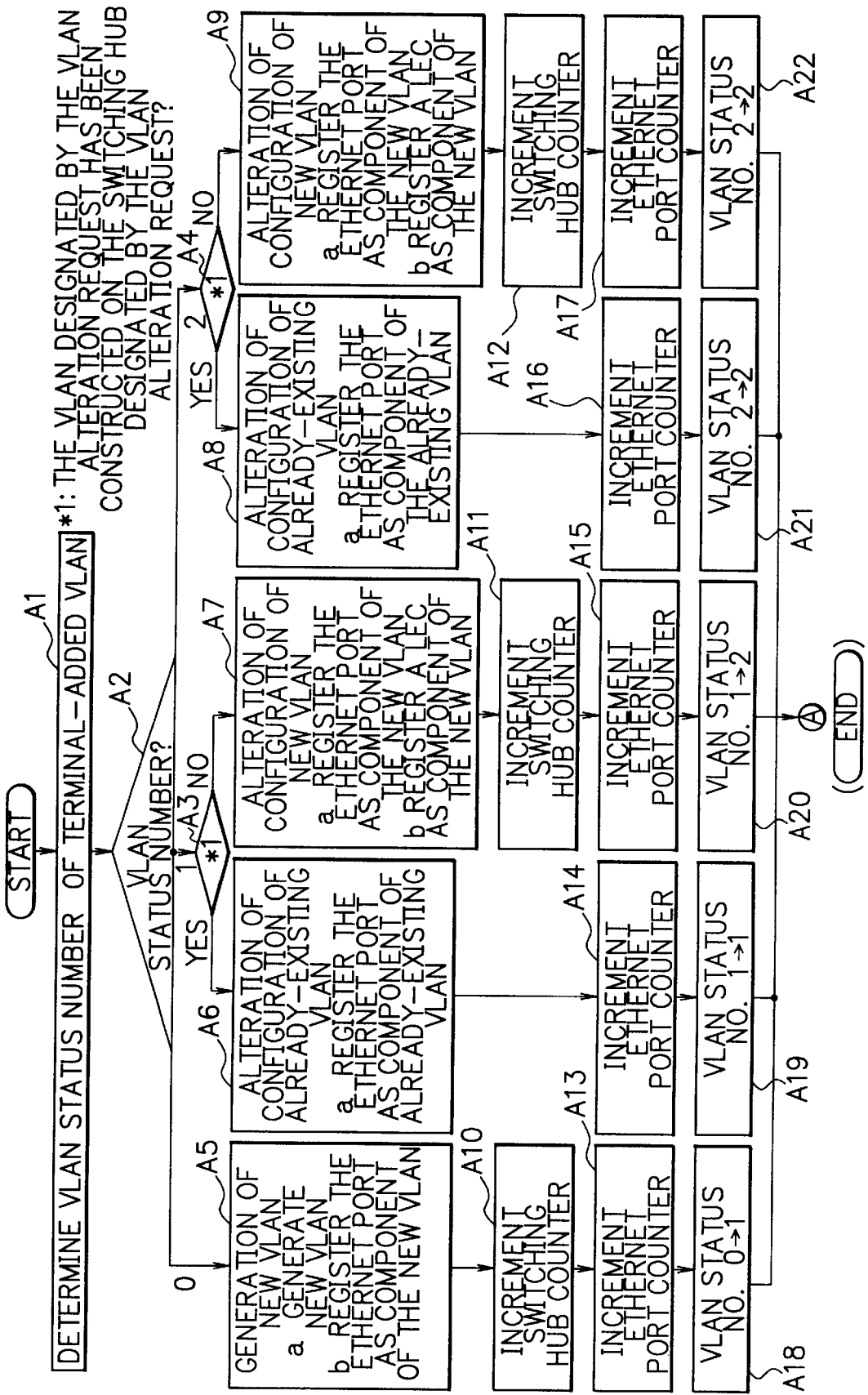
FIG. 4 is a flow chart showing the operation of the VLAN configuration instruction text editing section for editing a VLAN configuration instruction text when a terminal has been added to an Ethernet port of a switching hub.

Next, variations in the VLAN configuration status of a VLAN in the case where a terminal is added (connected) to an Ethernet port of the switching hub 2 by the user will be explained referring to FIGS. 1, 3 and 4. Hereafter, a VLAN in which the Ethernet port (to which the terminal has been added by the user) has been registered will be referred to as a "terminal-added VLAN")

When a terminal is added to an Ethernet port of the switching hub communication function section 25 of a switching hub 2 shown in FIG. 1, information indicating the terminal-added VLAN is edited (included) in the VLAN alteration request which is edited by the VLAN alteration request editing section 212 of the switching hub 2. The VLAN configuration instruction text editing section 15 of the automatic VLAN configuration information setting device 1 receives the VLAN alteration request, and obtains the VLAN status number of the terminal-added VLAN by searching the VLAN detailed information 19 stored in the database 11 using the information included in the VLAN alteration request as searching keys (step A1 of FIG. 4).

The VLAN configuration instruction text editing section 15 edits the VLAN configuration instruction text for varying the status of the terminal-added VLAN, according to the VLAN alteration request and the VLAN detailed information which has been stored in the database 11.

First, a case where the VLAN status number of the terminal-added VLAN is 0 ("0" in step A2 of FIG. 4) will be considered. In the case, one Ethernet port will actually be registered in the VLAN detailed information 19 in the database 11 of the automatic VLAN configuration information setting device 1, therefore, the input information 34 shown in FIG. 3 is inputted to the unshown VLAN status variation device and thereby the VLAN status number of the terminal-added VLAN is changed into 1 (step A18 of FIG. 4).

Next, a case where the VLAN status number of the terminal-added VLAN is 1 ("1" in step A2 of FIG. 4) will be considered. The case can be classified into two cases with respect to a judgment which is executed in step A3 of FIG. 4. In the step A3, it is judged whether or not the switching hub which is designated by the VLAN alteration request is included in switching hubs which are constructing the VLAN which is designated by the VLAN alteration request. The judgment can be expressed in other words: "The VLAN designated by the VLAN alteration request has been constructed on the switching hub designated by the VLAN alteration request?", as shown in *1 in FIG. 4.

The first case is a case where the result of the judgment of the step A3 is YES (i.e. a case where the VLAN designated by the VLAN alteration request has been constructed on the switching hub designated by the VLAN alteration request). In the case, the input information 37 shown in FIG. 3 is inputted to the unshown VLAN status variation device and the VLAN status number of the terminal-added VLAN is not changed from 1 (step A19 of FIG. 4).

The second case is a case where the result of the judgment of the step A3 is NO (i.e. a case where the VLAN designated by the VLAN alteration request has not been constructed on the switching hub designated by the VLAN alteration request). In the case, the input information 35 shown in FIG. 3 is inputted to the unshown VLAN status variation device and the VLAN status number of the terminal-added VLAN is changed into 2, since the terminal-added VLAN becomes a VLAN which is constructed across 2 or more switching hubs (step A20 of FIG. 4).

Next, a case where the VLAN status number of the terminal-added VLAN is 2 ("2" in step A2 of FIG. 4) will be considered. The case can be classified into two cases with respect to a judgment which is executed in step A4 of FIG. 4. The judgment executed in the step A4 is the same as the judgment of the step A3.

The first case is a case where the result of the judgment of the step A4 is YES (i.e. a case where the Ethernet port to which the terminal is going to be added is an Ethernet port of a switching hub to which the terminal has been connected). In the case, the input information 38 shown in FIG. 3 is inputted to the unshown VLAN status variation device and the VLAN status number of the terminal-added VLAN is not changed from 2 (step A21 of FIG. 4).

The second case is a case where the result of the judgment of the step A4 is NO (i.e. a case where the Ethernet port to which the terminal is going to be added is provided to a switching hub which is different from the switching hub to which the terminal has been connected). In the case, the input information 36 shown in FIG. 3 is inputted to the unshown VLAN status variation device. The terminal-added VLAN remains to be a VLAN which is constructed across 2 or more switching hubs, therefore, the VLAN status number of the terminal-added VLAN is not changed from 2 (step A22 of FIG. 4).

The VLAN configuration status of the terminal-added VLAN is varied as described above.

In the following, the operation of the automatic VLAN configuration information setting system for varying the VLAN status and the VLAN configuration information will be described.

The VLAN configuration status is defined by two kinds of components: Ethernet port groups (each of which is constructed by selecting one or more Ethernet ports from Ethernet ports in a switching hub 2 and grouping them) and LECs. The VLAN configuration status of a VLAN is updated by the unshown VLAN status variation device. As mentioned above, the VLAN status number "0" indicates a status "31" in which the VLAN which is managed by the unshown VLAN status variation device has no VLAN components. The VLAN status number "1" indicates a status "32" in which the VLAN which is managed by the VLAN status variation device has only one Ethernet port group as a VLAN component. The VLAN status number "2" indicates a status "33" in which the VLAN which is managed by the VLAN status variation device has Ethernet port groups and LECs as VLAN components.

For example, if the input information 34 shown in FIG. 3 is inputted to the VLAN status variation device in the status 31 having the VLAN status number "0", the VLAN status variation device edits a VLAN configuration instruction text for newly generating a VLAN which is composed of an Ethernet port group, and thereby changes the VLAN configuration status into the status 32 having the VLAN status number "1". On the other hand, if the input information 39 shown in FIG. 3 is inputted to the VLAN status variation device with respect to a VLAN in the status 32 with the VLAN status number "1", the VLAN status variation device edits a VLAN configuration instruction text for deleting an Ethernet port group composing the VLAN and thereby generating a status with no VLAN components, and thereby changes the VLAN configuration status of the VLAN into the status 31 having the VLAN status number "0".

As described above, the VLAN configuration instruction text editing section 15 edits the VLAN configuration instruction text by editing the input information and inputting the input information to its VLAN status variation device, sends the VLAN configuration instruction text to the database update section 16 and the VLAN remote update request editing section 14, and finishes its process.

The VLAN remote update request editing section 14 refers to the VLAN configuration instruction text, and thereby edits the VLAN remote update request which includes information for updating the VLAN configuration information which is stored in the VLAN configuration information storage section 24 of a corresponding switching hub 2. The VLAN remote update request editing section 14 sends the VLAN remote update request to the VLAN remote update request transmission section 17, and finishes its process. The VLAN remote update request transmission section 17 which received the VLAN remote update request transmits the VLAN remote update request to the VLAN remote update section 23 of the corresponding switching hub 2, and finishes its process.

The VLAN remote update section 23 in the switching hub 2 receives the VLAN remote update request from the automatic VLAN configuration information setting device 1 and updates the VLAN configuration information which is stored in the VLAN configuration information storage section 24, thereby automatic setting (updating) of the VLAN configuration information of the switching hub 2 is finished.

Figure 6:
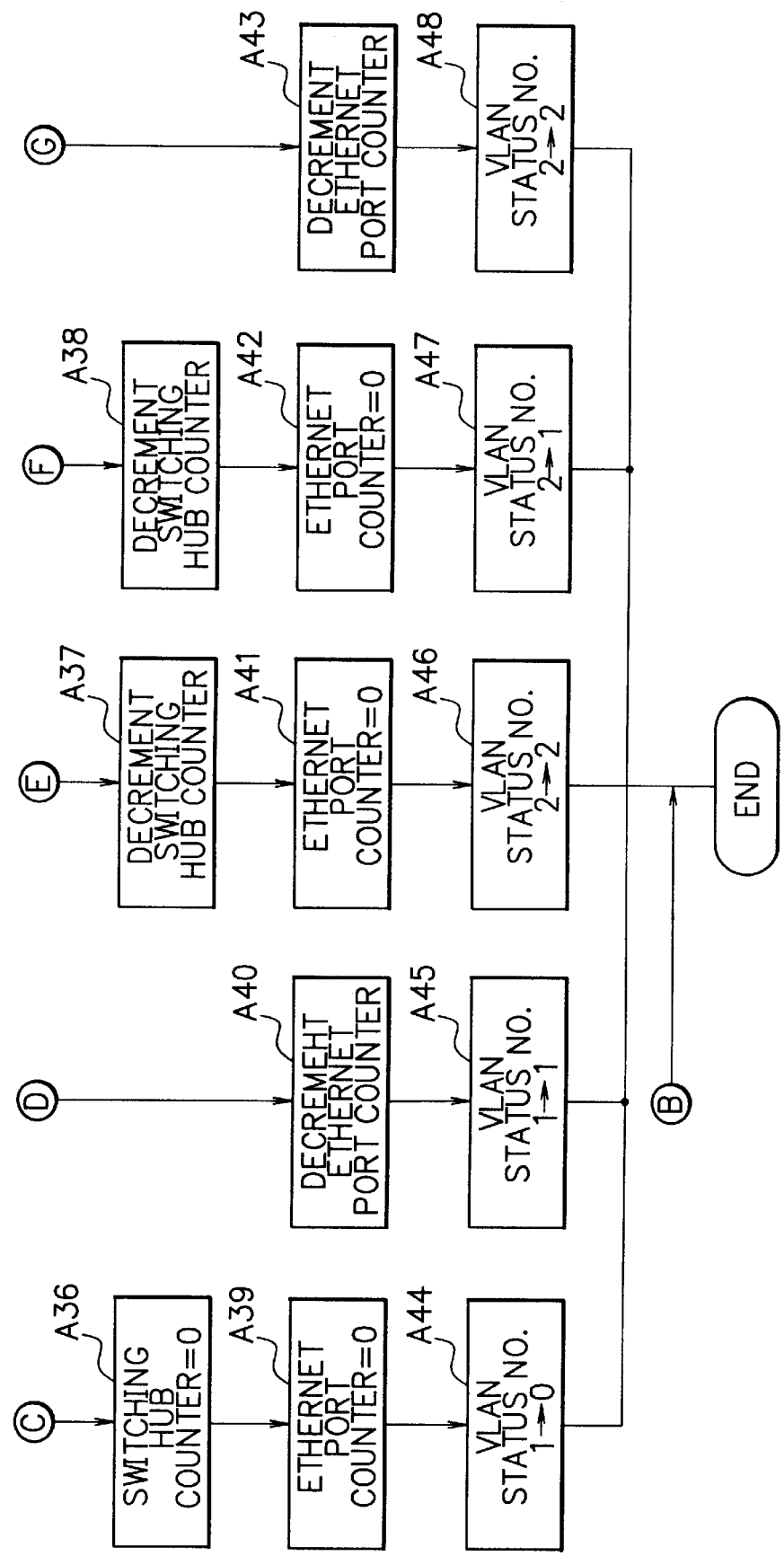

In the following, the operation of the automatic VLAN configuration information setting system of the first embodiment will be described more in detail referring to FIGS. 1–6. FIGS. 4–6 are flow charts showing the operation of the VLAN configuration instruction text editing section 15 of the automatic VLAN configuration information setting device 1 of the automatic VLAN configuration information setting system according to the first embodiment of the present invention. FIG. 4 shows the operation of the VLAN configuration instruction text editing section 15 for editing an addition VLAN configuration instruction text when a terminal has been added to an Ethernet port of a switching hub 2, and FIGS. 5 and 6 show the operation of the VLAN configuration instruction text editing section 15 for editing a deletion VLAN configuration instruction text when a terminal has been removed from an Ethernet port of a switching hub 2. The VLAN alteration request is generated and outputted by the VLAN alteration request section 21 of a switching hub 2 when an event (addition/removal of a terminal at an Ethernet port) occurred, and thus the VLAN alteration request is supplied to the VLAN configuration instruction text editing section 15 of the automatic VLAN configuration information setting device 1 on every occurrence of an event (i.e. addition/removal). Therefore, the VLAN configuration instruction text editing section 15 can edit and output the VLAN configuration instruction text on every occurrence of an event, that is, on every supply of the VLAN alteration request, and thus the FIGS. 4–6 can also be divided to two flow charts (a flow chart for editing the addition VLAN configuration instruction text (FIG. 4) and a flow chart for editing the deletion VLAN configuration instruction text (FIGS. 5 and 6) although FIGS. 4–6 have been made in a sequence. However, it is also possible to let the VLAN configuration instruction text editing section 15 edit and output a VLAN configuration instruction text corresponding to two or more VLAN alteration requests (i.e. two or more events) as the sequence shown in FIGS. 4–6, for example.

When a terminal is added to an Ethernet port of the switching hub communication function section 25 of a switching hub 2, the terminal movement detection section 213 detects the change and activates the VLAN alteration request editing section 212. The VLAN alteration request editing section 212 edits the VLAN alteration request based on terminal connection information obtained by the terminal movement detection section 213, and supplies the VLAN alteration request to the VLAN alteration request transmission section 211. The VLAN alteration request transmission section 211 transmits the VLAN alteration request to the VLAN alteration request receiving section 18 of the automatic VLAN configuration information setting device 1, thereby process of the VLAN alteration request section 21 of the switching hub 2 is finished.

Subsequently, the VLAN alteration request receiving section 18 in the automatic VLAN configuration information setting device 1 which received the VLAN alteration request sends the VLAN alteration request to the VLAN configuration instruction text editing section 15. The unshown VLAN status variation device of the VLAN configuration instruction text editing section 15 searches the VLAN detailed information which is stored in the database 11 using information in the VLAN alteration request as searching keys, and thereby obtains the VLAN status number of the VLAN in which the Ethernet port (to which a terminal has been added by the user) has been registered (step A1).

Subsequently, the VLAN status variation device edits the addition VLAN configuration instruction text according to the VLAN status number which has been determined in the step A1.

As mentioned before, The VLAN status number "0" indicates a status "31" in which the VLAN which is managed by the unshown VLAN status variation device has no VLAN components. The VLAN status number "1" indicates a status "32" in which the VLAN which is managed by the unshown VLAN status variation device has only one Ethernet port group as a VLAN component. The VLAN status number "2" indicates a status "33" in which the VLAN which is managed by the VLAN status variation device has Ethernet port groups and LECs as VLAN components.

In the case where the VLAN status number which has been determined in the step A1 is "0", the VLAN status number "0" means that the VLAN which is designated by the VLAN alteration request has been registered in the VLAN detailed information 19 in the database 11 of the automatic VLAN configuration information setting device 1 as having no VLAN components, but the VLAN does not exist in the VLAN configuration information storage section 24 of the switching hub 2. In other words, the VLAN has not been registered as a VLAN which can be utilized for communication.

In this case, the VLAN status variation device in the VLAN configuration instruction text editing section 15 edits a VLAN configuration instruction text for newly generating a VLAN (which is designated by the VLAN alteration request) on the switching hub 2 which is designated by the VLAN alteration request, and registering the Ethernet port (which is designated by the VLAN alteration request) in the VLAN as a VLAN component (step A5).

The VLAN status variation device handles two counters in order to manage a VLAN. One is a counter which indicates the number of switching hubs (i.e. the number of LECs) which composes the VLAN (hereafter referred to as a "switching hub counter"), and the other is a counter which indicates the number of Ethernet ports which are provided in the switching hub designated by the VLAN alteration request and which have been registered in the VLAN designated by the VLAN alteration request (hereafter referred to as a "Ethernet port counter"). The switching hub counter and the Ethernet port counter are stored in the database 11 as VLAN detailed information. The VLAN status variation device edits (includes) instructions for incrementing each of the switching hub counter and the Ethernet port counter of the newly generated VLAN by one, in the VLAN configuration instruction text (step A10, step A13).

Subsequently, the VLAN status variation device edits instructions for varying the VLAN status number of the terminal-added VLAN from 0 to 1, in the VLAN configuration instruction text (step A18).

In the case where the VLAN status number which has been determined in the step A1 is "1", the VLAN status variation device searches the VLAN detailed information 19 in the database 11 using information of the VLAN alteration request as searching keys, in order to judge whether or not the VLAN designated by the VLAN alteration request has been constructed on the switching hub designated by the VLAN alteration request (i.e. whether or not the switching hub which is designated by the VLAN alteration request is included in switching hubs which are constructing the VLAN which is designated by the VLAN alteration request) (step A3).

The result YES in the judgment of the step A3 means that the VLAN designated by the VLAN alteration request already exists on the switching hub which is designated by the VLAN alteration request. In this case, the VLAN status variation device edits a VLAN configuration instruction text for additionally registering the Ethernet port (designated by the VLAN alteration request) in the VLAN (which is designated by the VLAN alteration request, and which has already been existing on the switching hub designated by the VLAN alteration request) as a new VLAN component (step A6).

Subsequently, the VLAN status variation device edits instructions for incrementing the Ethernet port counter by one, in the VLAN configuration instruction text (step A14).

Subsequently, the VLAN status variation device edits instructions for keeping the VLAN status number of the terminal-added VLAN at 1, in the VLAN configuration instruction text (step A19).

The result NO in the judgment of the step A3 means that the VLAN designated by the VLAN alteration request does not exist on the switching hub which is designated by the VLAN alteration request, and exists on one or more switching hubs other than the designated switching hub. In this case, the VLAN status variation device edits a VLAN configuration instruction text for newly generating the VLAN designated by the VLAN alteration request on the switching hub designated by the VLAN alteration request, registering the Ethernet port designated by the VLAN alteration request and a LEC in the VLAN as VLAN components, and registering LECs in the one or more other switching hubs (on which the VLAN designated by the VLAN alteration request already exists) as VLAN components (step A7).

Subsequently, the VLAN status variation device edits instructions for incrementing each of the switching hub counter and the Ethernet port counter by one, in the VLAN configuration instruction text (step A11, step A15).

Subsequently, the VLAN status variation device edits instructions for varying the VLAN status number of the terminal-added VLAN from 1 to 2, in the VLAN configuration instruction text (step A20).

In the case where the VLAN status number which has been determined in the step A1 is "2", the VLAN status variation device searches the VLAN detailed information 19 in the database 11 using information of the VLAN alteration request as searching keys, in order to judge whether or not the VLAN designated by the VLAN alteration request has been constructed on the switching hub designated by the VLAN alteration request (i.e. whether or not the switching hub which is designated by the VLAN alteration request is included in switching hubs which are constructing the VLAN which is designated by the VLAN alteration request), in the same way as the step A3 (step A4).

The result YES in the judgment of the step A4 means that the VLAN designated by the VLAN alteration request already exists on the switching hub which is designated by the VLAN alteration request. In this case, the VLAN status variation device edits a VLAN configuration instruction text for additionally registering the Ethernet port (designated by the VLAN alteration request) in the VLAN (which is designated by the VLAN alteration request, and which has already been existing on the switching hub designated by the VLAN alteration request) as a new VLAN component (step A8).

Subsequently, the VLAN status variation device edits instructions for incrementing the Ethernet port counter by one, in the VLAN configuration instruction text (step A16).

Subsequently, the VLAN status variation device edits instructions for keeping the VLAN status number of the terminal-added VLAN at 2, in the VLAN configuration instruction text (step A21).

The result NO in the judgment of the step A4 means that the VLAN designated by the VLAN alteration request does not exist on the switching hub which is designated by the VLAN alteration request, and exists on two or more switching hubs other than the designated switching hub, as a VLAN having Ethernet port groups and LECs as VLAN components. In this case, the VLAN status variation device edits a VLAN configuration instruction text for newly generating the VLAN designated by the VLAN alteration request on the switching hub designated by the VLAN alteration request, and registering the Ethernet port designated by the VLAN alteration request and a LEC in the VLAN as VLAN components (step A9).

Subsequently, the VLAN status variation device edits instructions for incrementing each of the switching hub counter and the Ethernet port counter by one, in the VLAN configuration instruction text (step A12, step A17).

Subsequently, the VLAN status variation device edits instructions for keeping the VLAN status number of the terminal-added VLAN at 2, in the VLAN configuration instruction text (step A22).

The VLAN status variation device in the VLAN configuration instruction text editing section 15 executes editing of the VLAN configuration instruction text for additionally registering an Ethernet port (the "addition VLAN configuration instruction text"), as described above.

The VLAN status variation device which has finished the editing of the addition VLAN configuration instruction text edits a VLAN configuration instruction text for deleting an Ethernet port (the "deletion VLAN configuration instruction text") next, corresponding to a VLAN alteration request which indicates that the user has been removed a terminal from an Ethernet port of a switching hub 2. FIG. 5 and FIG. 6 show the operation of the VLAN status variation device for editing the deletion VLAN configuration instruction text.

First, the VLAN status variation device obtains the VLAN status number of a VLAN in which the Ethernet port (to which the terminal had been connected before removal) is registered (i.e. the terminal-removed VLAN), by searching the VLAN detailed information 19 in the database 11 utilizing information in the VLAN alteration request as searching keys (step A23).

If the VLAN status number could not be determined in the step A23 ("NO" in step A24), it is judged that the terminal which had been connected to the Ethernet port (designated by the VLAN alteration request) has not been connected to a VLAN which has been managed by the automatic VLAN configuration information setting device 1. In this case, process is ended without executing the procedure for the deletion VLAN configuration instruction text.

If the VLAN status number could be determined in the step A23 ("YES" in the step A24), the VLAN configuration instruction text editing section 15 obtains the value of the switching hub counter of the VLAN to which the terminal before movement had been connected (i.e. the terminal-removed VLAN), by searching the VLAN detailed information 19 in the database 11 utilizing information in the VLAN alteration request as searching keys (step A25).

Subsequently, the VLAN configuration instruction text editing section 15 obtains the value of the Ethernet port counter of the terminal-removed VLAN (i.e. obtains "the number of equivalent Ethernet ports"), by searching the VLAN detailed information 19 in the database 11 utilizing information in the VLAN alteration request as searching keys (step A26).

In the case where the VLAN status number determined in the step A23 is "1", process proceeds to step A28 (step A27).

In the step A28, it is judged whether or not the value of the Ethernet port counter obtained in the step A26 is 1.

If the value of the Ethernet port counter is 1 ("YES" in the step A28), it means that the terminal-removed VLAN (which is the target of the process) has only one Ethernet port as a VLAN component. In this case, the VLAN status variation device edits an VLAN configuration instruction text for deleting the Ethernet port from the terminal-removed VLAN and thereafter deleting the terminal-removed VLAN from the switching hub (step A31).

Subsequently, the VLAN status variation device edits instructions for clearing the switching hub counter and the Ethernet port counter to 0, in the VLAN configuration instruction text (step A36, step A39).

Subsequently, the VLAN status variation device edits instructions for varying the VLAN status number of the terminal-removed VLAN from 1 to 0, in the VLAN configuration instruction text (step A44).

If the value of the Ethernet port counter is not 1 ("NO") in the step A28, it means that the terminal-removed VLAN (which is the target of the process) has two or more Ethernet ports as VLAN components and thus the VLAN will not be deleted from the switching hub. In this case, the VLAN status variation device edits an VLAN configuration instruction text for deleting the Ethernet port from the terminal-removed VLAN (which has two or more Ethernet ports as VLAN components and to which the terminal had been connected before movement) (step A32).

Subsequently, the VLAN status variation device edits instructions for decrementing the Ethernet port counter by one, in the VLAN configuration instruction text (step A40).

Subsequently, the VLAN status variation device edits instructions for keeping the VLAN status number of the terminal-removed VLAN at 1, in the VLAN configuration instruction text (step A45).

In the case where the VLAN status number determined in the step A23 is "2" in the judgment of the step A27, process proceeds to step A29.

In the step A29, it is judged whether or not the value of the Ethernet port counter obtained in the step A26 is 1.

If the value of the Ethernet port counter is 1 ("YES" in the step A29), it is judged whether or not the value of the switching hub counter of the terminal-removed VLAN obtained in the step A25 is 3 or more (step A30). If YES (3 or more), it means that the terminal-removed VLAN has 3 or more LECs as VLAN components. In this case, the VLAN status variation device edits a VLAN configuration instruction text for deleting the Ethernet port (to which the terminal had been connected before removal) from the terminal-removed VLAN and thereafter deleting the terminal-removed VLAN from the switching hub (step A33).

Subsequently, the VLAN status variation device edits instructions for decrementing the switching hub counter by one and clearing the Ethernet port counter to 0, in the VLAN configuration instruction text (step A37, step A41).

Subsequently, the VLAN status variation device edits instructions for keeping the VLAN status number of the terminal-removed VLAN at 2, in the VLAN configuration instruction text (step A46).

If NO (2 or less) in the step A30, it means that the terminal-removed VLAN has 2 LECs as VLAN components. In this case, the VLAN status variation device edits a VLAN configuration instruction text for deleting the Ethernet port (to which the terminal had been connected before removal) from the terminal-removed VLAN and thereafter deleting the terminal-removed VLAN from the switching hub, in the same way as the step A33 (step A34).

Subsequently, the VLAN status variation device edits instructions for decrementing the switching hub counter by one and clearing the Ethernet port counter to 0, in the VLAN configuration instruction text (step A38, step A42).

Subsequently, the VLAN status variation device edits instructions for varying the VLAN status number of the terminal-removed VLAN from 2 to 1, in the VLAN configuration instruction text (step A47).

If NO (the value of the Ethernet port counter is not 1) in the step A29, it means that the number of Ethernet ports (which are provided in the switching hub designated by the VLAN alteration request and which have been registered in the terminal-removed VLAN) is 2 or more. In this case, the VLAN status variation device edits a VLAN configuration instruction text for deleting the Ethernet port from the terminal-removed VLAN (step A35).

Subsequently, the VLAN status variation device edits instructions for decrementing the Ethernet port counter by one, in the VLAN configuration instruction text (step A43).

Subsequently, the VLAN status variation device edits instructions for keeping the VLAN status number of the terminal-removed VLAN at 2, in the VLAN configuration instruction text (step A48).

As above, the VLAN configuration instruction text editing section 15 edits the addition VLAN configuration instruction text or the deletion VLAN configuration instruction text by operating its VLAN status variation device according to the input information. Subsequently, the VLAN configuration instruction text editing section 15 sends the VLAN configuration instruction text to the VLAN remote update request editing section 14 and the database update section 16, and finishes its process.

The VLAN remote update request editing section 14 refers to the VLAN configuration instruction text, and thereby edits the VLAN remote update request which includes information for updating the VLAN configuration information which is stored in the VLAN configuration information storage section 24 of a corresponding switching hub 2. The VLAN remote update request editing section 14 sends the VLAN remote update request to the VLAN remote update request transmission section 17, and finishes its process.

Subsequently, the VLAN remote update request transmission section 17 which received the VLAN remote update request transmits the VLAN remote update request to the VLAN remote update section 23 of the corresponding switching hub 2, and finishes its process.

Meanwhile, the database update section 16 which received the VLAN configuration instruction text from the VLAN configuration instruction text editing section 15 updates the VLAN detailed information 19 stored in the database 11 into the latest information according to the VLAN configuration instruction text, using the database search section 12 and the database writing section 13, and the automatic VLAN configuration information setting device 1 finishes its process which has been caused by the VLAN alteration request from the switching hub 2.

The VLAN remote update section 23 in the switching hub 2 receives the VLAN remote update request from the automatic VLAN configuration information setting device 1 and updates the VLAN configuration information which is stored in the VLAN configuration information storage section 24, thereby automatic setting (updating) of VLAN configuration information of the switching hub 2 is finished.

As described above, by the automatic VLAN configuration information setting system according to the first embodiment of the present invention, when the connection status of Ethernet ports of switching hubs changed, setting and update of VLAN configuration information in each switching hub are executed automatically corresponding to the change. Therefore, the network administrators can be relieved from enormous amount of tasks in complicated VLAN configuration information setting procedure, thereby labor and cost for operating and managing VLANs can be reduced.

Incidentally, although the VLAN status number which is used by the VLAN status variation device for expressing and recognizing the status of a VLAN was updated in the above explanation without reservation, it is also possible to let the VLAN remote update section 23 of the switching hub 2 send some kind of acknowledge message indicating that update of the VLAN configuration information stored in the VLAN configuration information storage section 24 could be executed normally and correctly, and let the automatic VLAN configuration information setting device 1 update the VLAN status number of the VLAN after reception of the acknowledge message.

In the following, a second embodiment according to the present invention will be described referring to FIG. 7 and FIG. 8.

Figure 7:
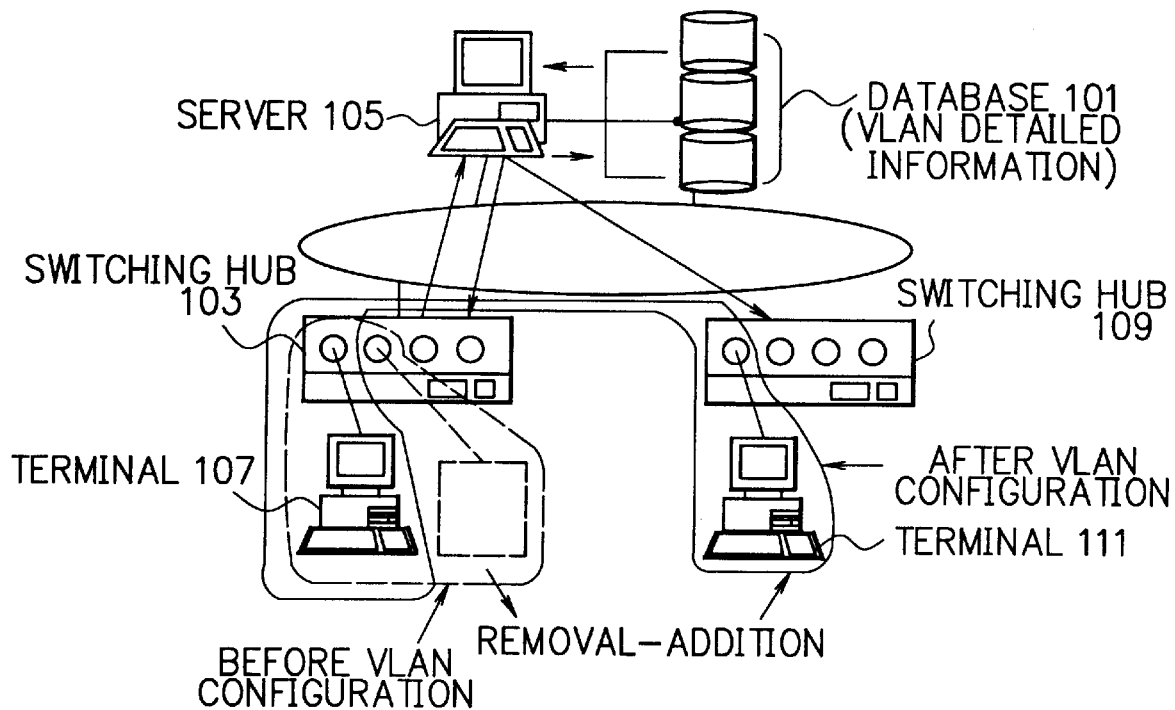
FIG. 7 is a schematic diagram showing an automatic VLAN configuration information setting system according to a second embodiment of the present invention.
Figure 8:
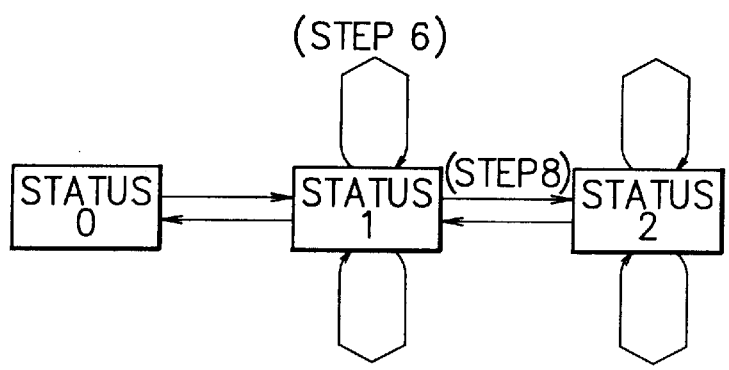
FIG. 8 is a schematic diagram showing variations in VLAN configuration status in the second embodiment.

FIG. 7 is a schematic diagram showing an automatic VLAN configuration information setting system according to a second embodiment of the present invention. As shown in FIG. 7, the automatic VLAN configuration information setting system of the second embodiment comprises a database 101 for storing VLAN detailed information, a server 105 which is connected with the database 101, and switching hubs 103 and 109 which are managed by the server 105. Two terminals 107 and 111 are connected to the switching hubs 103 and 109.

The automatic VLAN configuration information setting system of the second embodiment is an example in which the automatic VLAN configuration information setting device according to the present invention is realized by a personal computer, a workstation, etc. (the server 105). In the second embodiment, a case where only one VLAN is managed by the server 105 will be described, for simplicity.

In the following, the operation of the automatic VLAN configuration information setting system of FIG. 7 will be described.

For example, a case where the terminal 111 is moved from the switching hub 103 to the switching hub 109 will be explained. Before movement, both the terminals 107 and 111 are connected to the switching hub 103. When the terminal 111 is removed from an Ethernet port of the switching hub 103 by the user, the switching hub 103 transmits information concerning the removal of the terminal 111 into the server 105 as a VLAN alteration request. The VLAN alteration request in a terminal removal event includes, for example, information concerning the Ethernet port from which the terminal 111 has been removed by the user (port No. etc.), information concerning the switching hub 103 itself (device ID etc.), information concerning a VLAN to which the Ethernet port (the terminal 111) is related (the name etc. of the VLAN) (step 1).

The server 105 executes management of the VLAN using its VLAN status variation device which is not shown in FIG. 7. The VLAN alteration request sent from the switching hub 103 is used as an event for activating the unshown VLAN status variation device. The activated VLAN status variation device edits a "VLAN configuration alteration scenario", by referring to the VLAN detailed information which is stored in the database 101 and the VLAN alteration request (step 2).

Subsequently, the server 105 updates the VLAN detailed information stored in the database 101 according to the VLAN configuration alteration scenario which has been edited in the step 2 (step 3).

Subsequently, the server 105 updates VLAN configuration information of the switching hub 103 according to the VLAN configuration alteration scenario, by sending, for example, SNMP (Simple Network Management Protocol) messages to the switching hub 103 (step 4).

Here, the operation of the VLAN status variation device of the server 105 in the step 2 for editing the VLAN configuration alteration scenario will be described in detail referring to FIG. 8. As shown in FIG. 8, the status of the VLAN can be classified into 3 statuses as follows.

(0) vacancy
(1) one switching hub is involved in the VLAN
(2) two switching hubs are involved in the VLAN The VLAN status variation device is activated by the VLAN alteration request which is outputted by a switching hub, when a terminal is removed from an Ethernet port of the switching hub or when a terminal is connected to an Ethernet port of the switching hub. When the VLAN alteration request sent from the switching hub is received by the server 105, the server 105 activates the VLAN status variation device and varies the VLAN status of the VLAN according to a rule.

In the second embodiment shown in FIGS. 7 and 8, the VLAN status is of the VLAN is varied by the VLAN status variation device as follows, for example.

In the case where a VLAN alteration request indicating a terminal removal event is supplied from the switching hub 103 to the VLAN status variation device of the server 105 when the VLAN is in the VLAN status "1" (step 5), the VLAN status of the VLAN is not varied from "1" if one or more terminals will remain in the same switching hub 103 and in the same VLAN after the terminal removal from the switching hub 103. Therefore, when the terminal 111 is removed from the switching hub 103 by the user as shown in FIG. 7, the VLAN status of the VLAN is not varied from "1", since the terminal 107 is still connected to the switching hub 103 (step 6).

In the case where a VLAN alteration request indicating a terminal addition event is supplied from another switching hub 109 to the VLAN status variation device of the server 105 when the VLAN is in the VLAN status "1" (step 7), the VLAN status of the VLAN is varied from "1" to "2" if the switching hub 109 has not been involved in the VLAN. Therefore, when the terminal 111 which has been removed from the switching hub 103 is connected to the switching hub 109 by the user as shown in FIG. 7, the VLAN status of the VLAN is varied from "1" to "2", since the terminal addition has been executed by the user to the new switching hub 109 which has not been involved in the VLAN (step 8).

As described above, on every event (addition or removal of a terminal), the VLAN alteration request is outputted by the switching hub (in which the event occurred) to the server 105, and the VLAN configuration alteration scenario is edited and executed by the VLAN status variation device of the server 105. Therefore, VLAN configuration information of switching hubs 103 and 109 can be automatically updated, corresponding to each event.

In the following, the correspondence between the automatic VLAN configuration information setting system of the second embodiment (FIGS. 7 and 8) and the automatic VLAN configuration information setting system of the first embodiment (FIGS. 1 through 6) will be explained.

With respect to composition, the database 101 and the server 105 of the second embodiment added together corresponds to the automatic VLAN configuration information setting device 1 of the first embodiment.

With respect to the operation, the step 1 in the second embodiment corresponds to the operation of the VLAN alteration request section 21 for outputting the VLAN alteration request to the automatic VLAN configuration information setting device 1 in the first embodiment.

The step 2 in the second embodiment corresponds to the operation of the VLAN configuration instruction text editing section 15 for editing the VLAN configuration instruction text in the first embodiment.

The step 3 in the second embodiment corresponds to the operation of the database update section 16 for updating the database 11 according to the VLAN configuration instruction text using the database writing section 13 etc. in the first embodiment.

The step 4 in the second embodiment corresponds to the operation of the VLAN remote update request editing section 14, VLAN remote update request transmission section 17 and the VLAN remote update section 23 for updating the VLAN configuration information stored in the VLAN configuration information storage section 24 according to the VLAN configuration instruction text in the first embodiment.

The step 5 in the second embodiment corresponds to the operation of the VLAN status variation device of the VLAN configuration instruction text editing section 15 for receiving the input information in the first embodiment.

The step 6 in the second embodiment corresponds to the operation of the VLAN status variation device in the case where it received the input information 42 when the VLAN designated by the VLAN alteration request is in the VLAN status "32" (having only one Ethernet port group as a VLAN component) in the first embodiment.

The step 7 in the second embodiment corresponds to the operation of the VLAN status variation device of the VLAN configuration instruction text editing section 15 for receiving the input information in the first embodiment.

The step 8 in the second embodiment corresponds to the operation of the VLAN status variation device in the case where it received the input information 35 when the VLAN designated by the VLAN alteration request is in the VLAN status "32" (having only one Ethernet port group as a VLAN component) in the first embodiment.

As described above, by the automatic VLAN configuration information setting system according to the second embodiment of the present invention, basically the same effects as those of the first embodiment can be obtained.

As set forth hereinabove, by the system and the method for automatically setting VLAN configuration information according to the present invention, when the connection status of Ethernet ports of switching hubs changed, setting and update of VLAN configuration information in each switching hub are executed automatically corresponding to the change. Therefore, tasks of network administrators in VLAN configuration information setting procedure can be lightened, and thereby labor and cost for operating and managing VLANs can be reduced.

Incidentally, the system and method according to the present invention can be applied to cases where an Ethernet port of a switching hub can be used for two or more VLANs (that is, cases where an Ethernet port is involved in two or more VLANs). The VLAN detailed information stored in the database is composed of element tables and links concerning each VLAN. Therefore, the VLAN detailed information can support such cases by defining appropriate links.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An automatic VLAN configuration information setting system comprising an automatic VLAN configuration information setting means and one or more switching hubs, wherein:

the switching hub includes:
a switching hub communication function means which is provided with one or more Ethernet ports to which terminals can be connected;
a VLAN alteration request means for generating a VLAN alteration request according to terminal connection information which is supplied from the switching hub communication function means and sending the VLAN alteration request to the automatic VLAN configuration information setting means;
a VLAN configuration information storage means for storing VLAN configuration information concerning VLANs in which the switching hub is involved;
a VLAN remote update means for receiving a VLAN remote update request which is sent from the automatic VLAN configuration information setting means and updating the VLAN configuration information stored in the VLAN configuration information storage means according to the VLAN remote update request; and
a VLAN control means for controlling the switching hub communication function means according to the VLAN configuration information which is stored in the VLAN configuration information storage means, and the automatic VLAN configuration information setting means includes:
a VLAN alteration request receiving means for receiving the VLAN alteration request which is sent from the VLAN alteration request means of a switching hub;
a database for storing VLAN detailed information of VLANs in which the one or more switching hubs are involved;
a database search means for searching the database;
a database writing means for executing writing into the database;
a VLAN configuration instruction text editing means for editing a VLAN configuration instruction text according to the VLAN alteration request which is supplied from the VLAN alteration request receiving means and results of search for the VLAN detailed information which have been stored in the database using the database search means;
a database update means for updating the database by controlling the database writing means according to the VLAN configuration instruction text which is outputted by the VLAN configuration instruction text editing means;
a VLAN remote update request editing means for editing a VLAN remote update request which includes information about update of the VLAN configuration information which is stored in the VLAN configuration information storage means of a corresponding switching hub, by referring to the VLAN configuration instruction text which is outputted by the VLAN configuration instruction text editing means; and
a VLAN remote update request transmission means for transmitting the VLAN remote update request supplied from the VLAN remote update request editing means into the VLAN remote update means of the corresponding switching hub.

2. An automatic VLAN configuration information setting system as claimed in claim 1, wherein the VLAN alteration request means in the switching hub includes:
a terminal movement detection means for detecting addition or removal of a terminal in the switching hub communication function means and outputting the terminal connection information concerning the addition/removal of the terminal;
a VLAN alteration request editing means for editing and outputting the VLAN alteration request according to the terminal connection information supplied from the terminal movement detection means; and a VLAN alteration request transmission means for transmitting the VLAN alteration request outputted by the VLAN alteration request editing means into the VLAN alteration request receiving means of the automatic VLAN configuration information setting means.

3. An automatic VLAN configuration information setting system as claimed in claim 1, wherein the VLAN alteration request generated by the VLAN alteration request means of the switching hub includes:

information indicating an Ethernet port to which a terminal has been added or from which a terminal has been removed by the user;

information indicating the switching hub; and information indicating a VLAN to which the Ethernet port is related.

4. An automatic VLAN configuration information setting system as claimed in claim 3, wherein the VLAN configuration instruction text editing means includes a VLAN status variation means which receives input information which has been edited by the VLAN configuration instruction text editing means based on the VLAN detailed information stored in the database and the VLAN alteration request, edits the VLAN configuration instruction text according to the input information, and manages and varies the statuses of VLANs by outputting the VLAN configuration instruction text.

5. An automatic VLAN configuration information setting system as claimed in claim 4, wherein the input information includes addition information which indicates that a terminal has been added to the switching hub.

6. An automatic VLAN configuration information setting system as claimed in claim 5, wherein the addition information includes information indicating whether or not the VLAN designated by the VLAN alteration request has been constructed on the switching hub designated by the VLAN alteration request.

7. An automatic VLAN configuration information setting system as claimed in claim 4, wherein the input information includes removal information which indicates that a terminal has been removed from the switching hub.

8. An automatic VLAN configuration information setting system as claimed in claim 7, wherein the removal information includes information about the number of Ethernet ports which are provided in the switching hub designated by the VLAN alteration request and which have been registered in the VLAN designated by the VLAN alteration request.

9. An automatic VLAN configuration information setting system as claimed in claim 4, wherein the status of the VLAN managed and varied by the VLAN status variation means is classified into:

a status indicated by a VLAN status number 0 in which the VLAN managed by the VLAN status variation means has no VLAN components which have actually been registered in the VLAN detailed information;

a status indicated by a VLAN status number 1 in which the VLAN managed by the VLAN status variation means has an Ethernet port group as a VLAN component which has actually been registered in the VLAN detailed information and the VLAN has not been constructed across two or more switching hubs; and a status indicated by a VLAN status number 2 in which the VLAN managed by the VLAN status variation means has Ethernet port groups and LECs (Lan Emulation Clients) as VLAN components which have actually been registered in the VLAN detailed information and the VLAN has been constructed across two or more switching hubs.

10. An automatic VLAN configuration information setting system as claimed in claim 1, wherein the VLAN remote update request transmission means in the automatic VLAN configuration information setting means and the VLAN remote update means in the switching hub execute communication of the VLAN remote update request according to SNMP (Simple Network Management Protocol).

11. A method for automatically setting VLAN configuration information of switching hubs in a system which includes an automatic VLAN configuration information setting means and one or more switching hubs, comprising the steps of:

a terminal connection information outputting step in which a switching hub communication function means of a switching hub provided with one or more Ethernet ports outputs terminal connection information of terminals which are connected to the Ethernet ports;

a VLAN alteration request step in which a VLAN alteration request means of the switching hub generates a VLAN alteration request according to the terminal connection information supplied from the switching hub communication function means and sends the VLAN alteration request to the automatic VLAN configuration information setting means;

a VLAN alteration request receiving step in which a VLAN alteration request receiving means of the automatic VLAN configuration information setting means receives the VLAN alteration request from the VLAN alteration request means of the switching hub;

a VLAN configuration instruction text editing step in which a VLAN configuration instruction text editing means of the automatic VLAN configuration information setting means edits a VLAN configuration instruction text according to the VLAN alteration request and results of search of a database of the automatic VLAN configuration information setting means which stores VLAN detailed information of VLANs in which the one or more switching hubs are involved;

a database update step in which a database update means of the automatic VLAN configuration information setting means updates the database according to the VLAN configuration instruction text which is outputted by the VLAN configuration instruction text editing means;

a VLAN remote update request editing step in which a VLAN remote update request editing means of the automatic VLAN configuration information setting means edits a VLAN remote update request which includes information about update of VLAN configuration information which is stored in a VLAN configuration information storage means of a corresponding switching hub, by referring to the VLAN configuration instruction text which is outputted by the VLAN configuration instruction text editing means;

a VLAN remote update request transmission step in which a VLAN remote update request transmission means of the automatic VLAN configuration information setting means transmits the VLAN remote update request supplied from the VLAN remote update request editing means into a VLAN remote update means of the corresponding switching hub;

a VLAN remote update step in which the VLAN remote update means of the corresponding switching hub receives the VLAN remote update request from the VLAN remote update request transmission means of the automatic VLAN configuration information setting means and updates the VLAN configuration information concerning VLANs in which the switching hub is involved which is stored in the VLAN configuration information storage means according to the VLAN remote update request; and a VLAN control step in which a VLAN control means of the switching hub controls the switching hub communication function means of the switching hub according to the VLAN configuration information which is stored in the VLAN configuration information storage means.

12. A method as claimed in claim 11, wherein the VLAN alteration request step includes:

a terminal movement detection step in which a terminal movement detection means of the VLAN alteration request means detects addition or removal of a terminal in the switching hub communication function means and outputs the terminal connection information concerning the addition/removal of the terminal;

a VLAN alteration request editing step in which a VLAN alteration request editing means of the VLAN alteration request means edits and outputs the VLAN alteration request according to the terminal connection information supplied from the terminal movement detection means; and a VLAN alteration request transmission step in which a VLAN alteration request transmission means of the VLAN alteration request means transmits the VLAN alteration request outputted by the VLAN alteration request editing means into the VLAN alteration request receiving means of the automatic VLAN configuration information setting means.

13. A method as claimed in claim 11, wherein the VLAN alteration request which is generated in the VLAN alteration request step includes:

information indicating an Ethernet port to which a terminal has been added or from which a terminal has been removed by the user;

information indicating the switching hub; and information indicating a VLAN to which the Ethernet port is related.

14. A method as claimed in claim 13, wherein the VLAN configuration instruction text editing step includes:

an input information editing step in which the VLAN configuration instruction text editing means edits input information based on the VLAN detailed information stored in the database and the VLAN alteration request;

an input information inputting step in which the VLAN configuration instruction text editing means inputs the input information into its VLAN status variation means; and a VLAN configuration instruction text outputting step in which the VLAN status variation means edits and outputs the VLAN configuration instruction text according to the input information in order to manage and vary the statuses of VLANs.

15. A method as claimed in claim 14, wherein the input information includes addition information which indicates that a terminal has been added to the switching hub.

16. A method as claimed in claim 15, wherein the addition information includes information indicating whether or not the VLAN designated by the VLAN alteration request has been constructed on the switching hub designated by the VLAN alteration request.

17. A method as claimed in claim 14, wherein the input information includes removal information which indicates that a terminal has been removed from the switching hub.

18. A method as claimed in claim 17, wherein the removal information includes information about the number of Ethernet ports which are provided in the switching hub designated by the VLAN alteration request and which have been registered in the VLAN designated by the VLAN alteration request.

19. A method as claimed in claim 14, wherein the status of the VLAN managed and varied by the VLAN status variation means is classified into:

a status indicated by a VLAN status number 0 in which the VLAN managed by the VLAN status variation means has no VLAN components which have actually been registered in the VLAN detailed information;

a status indicated by a VLAN status number 1 in which the VLAN managed by the VLAN status variation means has an Ethernet port group as a VLAN component which has actually been registered in the VLAN detailed information and the VLAN has not been constructed across two or more switching hubs; and a status indicated by a VLAN status number 2 in which the VLAN managed by the VLAN status variation means has Ethernet port groups and LECs (Lan Emulation Clients) as VLAN components which have actually been registered in the VLAN detailed information and the VLAN has been constructed across two or more switching hubs.

20. A method as claimed in claim 11, wherein the VLAN remote update request transmission means in the automatic VLAN configuration information setting means and the VLAN remote update means in the switching hub execute communication of the VLAN remote update request according to SNMP (Simple Network Management Protocol).

* * * * *